US010674417B2

(12) United States Patent
Choquette

(10) Patent No.: US 10,674,417 B2
(45) Date of Patent: Jun. 2, 2020

(54) HITLESS SATELLITE-TO-SATELLITE HANDOVERS USING A PHASED ARRAY ANTENNA

(71) Applicant: George Choquette, Germantown, MD (US)

(72) Inventor: George Choquette, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/228,685

(22) Filed: Dec. 20, 2018

(65) Prior Publication Data
US 2020/0029265 A1 Jan. 23, 2020

Related U.S. Application Data

(60) Provisional application No. 62/702,189, filed on Jul. 23, 2018.

(51) Int. Cl.
H04W 36/18 (2009.01)
H04W 36/12 (2009.01)
(Continued)

(52) U.S. Cl.
CPC ........ H04W 36/18 (2013.01); H04B 7/18528 (2013.01); H04B 7/195 (2013.01); H04W 36/12 (2013.01)

(58) Field of Classification Search
CPC .. H04W 36/18; H04W 36/12; H04B 7/18528; H04B 7/195
See application file for complete search history.

(56) References Cited

U.S. PATENT DOCUMENTS 6,128,488 A 10/2000 Sauvageot et al.
2016/0170029 A1* 6/2016 Wyler ..................... G01S 19/24
2017/0149677 A1 5/2017 Barda et al.

FOREIGN PATENT DOCUMENTS

WO 2015108997 A1 7/2015

OTHER PUBLICATIONS

International search report for International Application No. PCT/US2019/042816.

* cited by examiner

Primary Examiner — Ronald B Abelson
(74) Attorney, Agent, or Firm — Capital City Techlaw; Jasbir Singh

(57) ABSTRACT

A method for a hitless handover in a hitless handover of communications in a Radio Frequency (RF) network is disclosed. The method including: providing a terminal comprising a first demodulator, a second demodulator and a phased array antenna; receiving communications via a first outroute signal in a first coverage area with the phased array antenna over a first outroute and processed by the first demodulator; transmitting a first inroute signal in the first coverage area with the phased array antenna over a first inroute; determining that the first outroute is setting when the terminal is imminently leaving the first coverage area and that a second outroute is rising when the terminal is entering a second coverage area; acquiring a second outroute signal in a second coverage area with the phased array antenna over the second outroute and processed by the second demodulator; sending a request to receive the communications over the second outroute, while the terminal is disposed in an overlap of the first coverage area and the second coverage area; establishing communications via the second outroute; and handing over communications from the first outroute to the second outroute while the terminal is (Continued)

disposed in the overlap, where the communications are received by the terminal without interruption, without a pause and without replication over the first outroute and the second outroute.

21 Claims, 8 Drawing Sheets

(51) Int. Cl.
*H04B 7/195* (2006.01)
*H04B 7/185* (2006.01)

Receive communications via a first outroute signal in a first coverage area with a phased array antenna over a first outroute and processed by the first demodulator

802

Transmit a first inroute signal in the first coverage area with the phased array antenna over a first inroute

804

Determine that the first outroute is setting when the terminal is imminently leaving the first coverage area and that a second outroute is rising

806

Acquire a second outroute signal in a second coverage area with the phased array antenna over the second outroute and processed by the second demodulator

808

Send a request to receive the communications over the second outroute, while the terminal is disposed in an overlap of the first coverage area and the second coverage area

810

Establish communications via the second outroute

812

Hand over communications from the first outroute to the second outroute while the terminal is disposed in the overlap

814

Establish a second inroute via the second coverage area after the establishing of the second outroute

HITLESS SATELLITE-TO-SATELLITE HANDOVERS USING A PHASED ARRAY ANTENNA

FIELD

The present teachings disclose a hitless satellite-to-satellite handover using a single antenna in a High-Altitude Platform (HAP), Low-Earth Orbit (LEO), Medium-Earth Orbit (MEO) or Geosynchronous-Earth Orbit (GEO) satellite configuration for an immobile or mobile Very Small Aperture Terminal (VSAT). The present disclosure uses a phased array antenna in the VSAT to establish a new communication path, when an old path is active, but loss of the old path is imminent.

BACKGROUND

Satellite-to-satellite handover, with associated changing of antenna pointing from one satellite to another, is used for satellite ground terminals communicating through a Low Earth Orbit (LEO) or Medium Earth orbit (MEO) satellite. The satellite-to-satellite handover may be used for mobile satellite terminals communicating through a Geosynchronous Earth Orbit (GEO) satellite when a terminal can move between coverage areas of two GEO satellites, for example, a terminal on a plane in flight. For a LEO or MEO system terminal, a Very Small Aperture Terminal (VSAT) communicates via a satellite moving in an arc across the sky and eventually beyond a range of the VSAT antenna or link (i.e., waveform). The VSAT maintains communication continuity by switching its antenna and communication path to a different satellite in range. For a GEO system mobile terminal, the terminal moves while the satellite remains effectively in the same orbital location, and as the terminal moves out of the coverage range of a GEO satellite the VSAT maintains continuity of communication by switching its antenna and communication path to a different GEO satellite in coverage range.

In the prior art, such satellite-to-satellite handover has been achieved using a single antenna that is repointed to transition the communication path from one satellite to another. Protocol signaling may be used between the VSAT and a Gateway (GW) to pause traffic during repointing/handover and to exchange handover signaling to avoid packet loss. A satellite system may omit use of such a protocol with consequent packet loss, and possibly with higher layer protocol recovery.

In the prior art, satellite-to-satellite handover has also been achieved using multiple antennas, such that one antenna is pointed at a new satellite while another antenna is pointed at and is in active use for traffic with another satellite. In such configurations, the uplink and downlink communication paths are switched from one antenna to the other at the same time.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings provide a hitless handover using a single phased array antenna in a VSAT. The uplink and downlink switching may be decoupled for more flexibility. The present teachings also disclose processes for link adaptation, context establishment and bandwidth allocation to minimize the handover process and time.

"Hitless" in the present context signifies that communication traffic is transitioned from a path through a one satellite and associated Gateway, to a path through another satellite and an associated Gateway (perhaps the same Gateway), while maintaining the traffic flow without pause, interruption, loss, or material discontinuity or delay in delivery of the required Quality of Service (QoS) arising from protocols and operations to switch the traffic from the old to the new communication path. The present teachings include:

A single phased array antenna, for example, at a VSAT, to simultaneously receive forward channel carriers from different satellites in different orbital locations.

Decoupling of the switching of the VSAT forward and return communication paths from one satellite to another during a handover process, such that the forward path is switched prior to switching the return path.

Achieving a handover without packet loss, without packet replication over the old and new satellite paths, and without pausing and subsequently resuming the traffic flow.

Establishing a VSAT forward path link through a new satellite path, without interrupting communication through the old or currently active satellite path.

Synchronizing a VSAT return path timing through the new satellite path, without interrupting communication through the old satellite path.

Allocating VSAT return (i.e., uplink) bandwidth through a new satellite path, without interrupting communication through the old satellite path.

Establishing a VSAT communication context through a new satellite path, without interrupting active communication through the old satellite path.

A method for a hitless handover in a hitless handover of communications in a Radio Frequency (RF) network is disclosed. The method including: providing a terminal comprising a first demodulator, a second demodulator and a phased array antenna; receiving communications via a first outroute signal in a first coverage area with the phased array antenna over a first outroute and processed by the first demodulator; transmitting a first inroute signal in the first coverage area with the phased array antenna over a first inroute; determining that the first outroute is setting when the terminal is imminently leaving the first coverage area and that a second outroute is rising when the terminal is entering a second coverage area; acquiring a second outroute signal in a second coverage area with the phased array antenna over the second outroute and processed by the second demodulator; sending a request to receive the communications over the second outroute, while the terminal is disposed in an overlap of the first coverage area and the second coverage area; establishing communications via the second outroute; and handing over communications from the first outroute to the second outroute while the terminal is disposed in the overlap, where the communications are received by the terminal without interruption, without a pause and without replication over the first outroute and the second outroute.

Additional features will be set forth in the description that follows, and in part will be apparent from the description, or may be learned by practice of what is described.

DRAWINGS

In order to describe the way, the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail using the accompanying drawings.

FIG. 4a, FIG. 4b, FIG. 4c, FIG. 4d, and FIG. 4e illustrate exemplary gateway configurations according to various embodiments.

Figure 5:
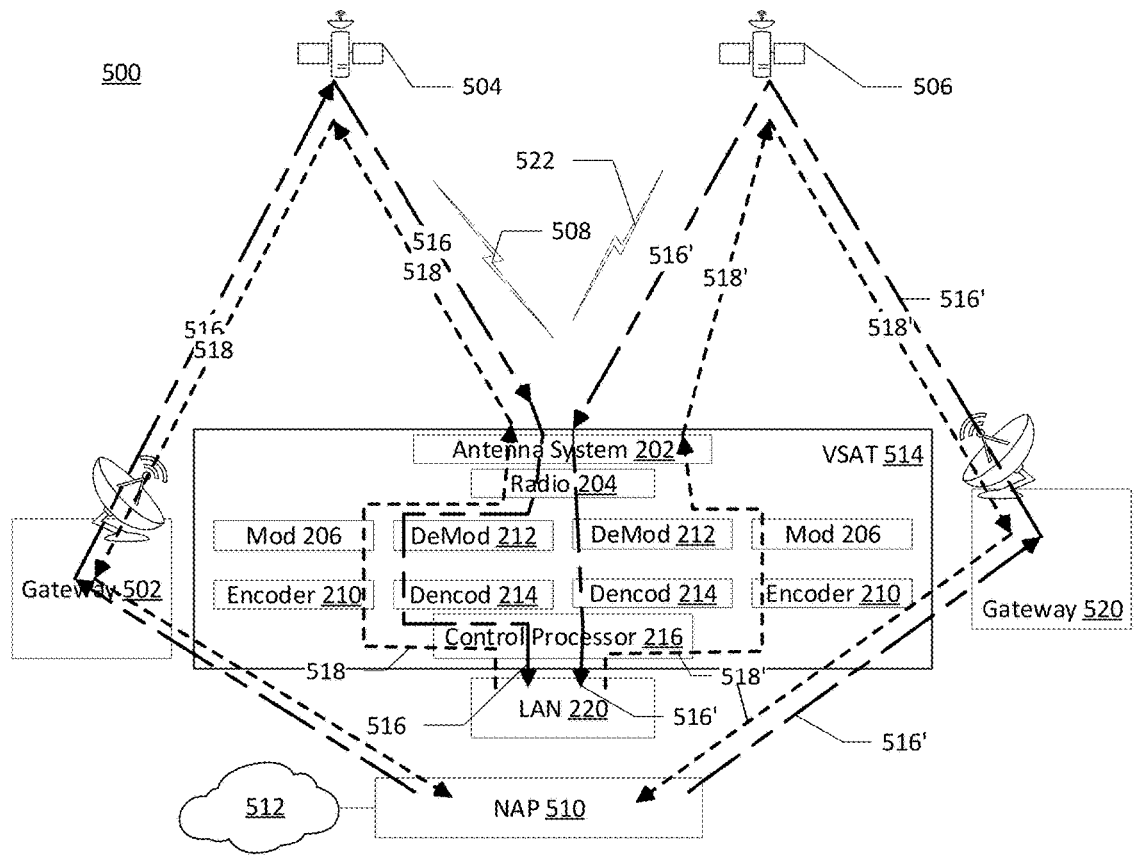

FIG. 5 illustrates a satellite network providing for a satellite-to-satellite handover according to various embodiments.

Figure 6:
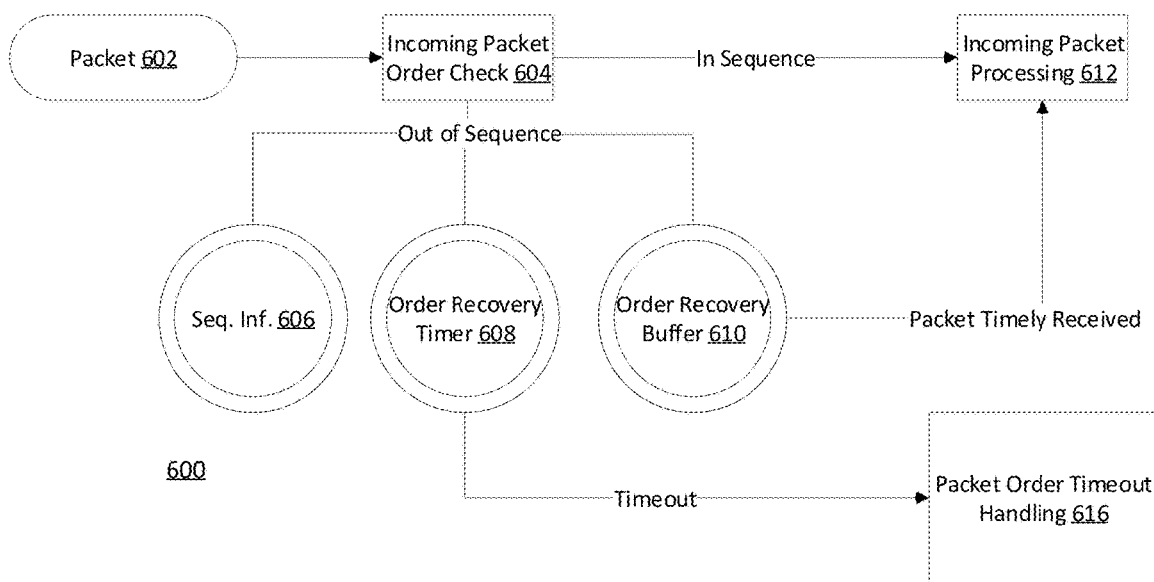

FIG. 6 illustrates a process for handling out of order packet delivery during a hitless satellite-to-satellite handover according to various embodiments.

Figure 7:
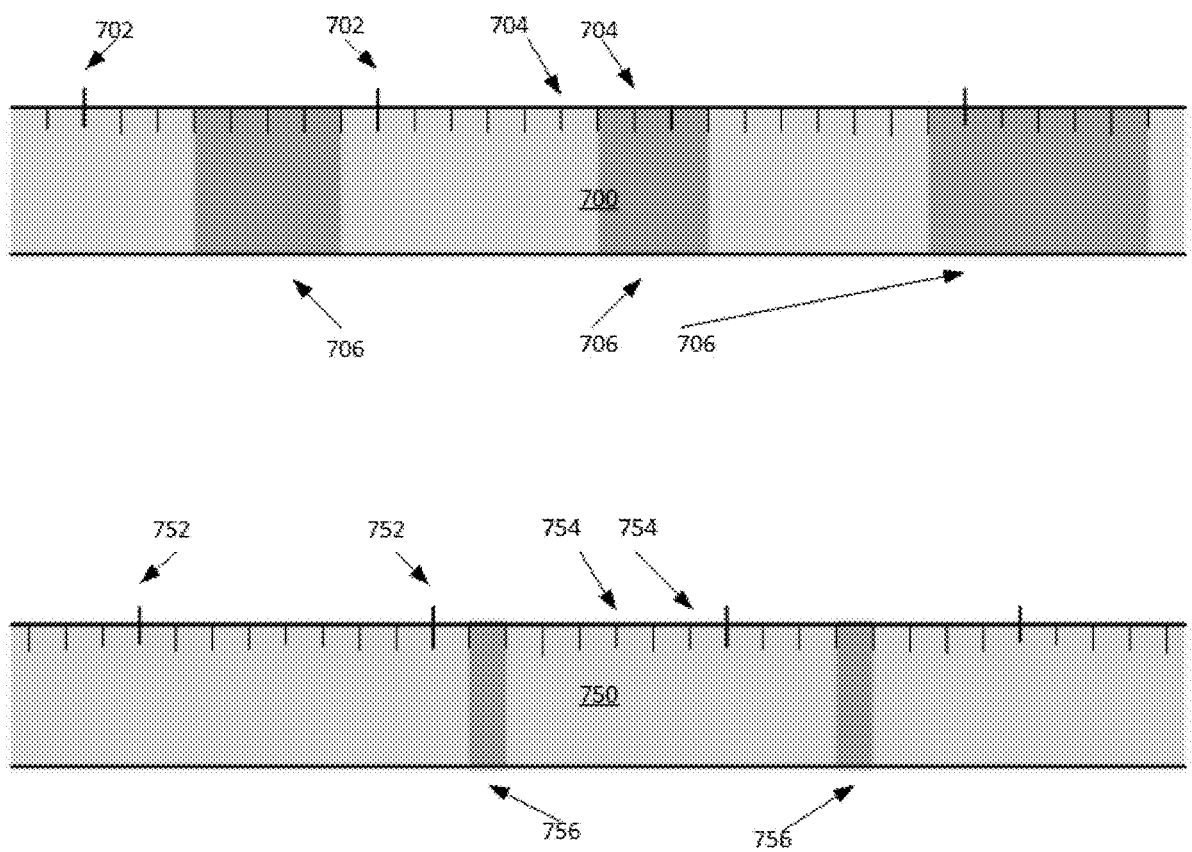

FIG. 7 illustrates ranging transmissions interspersed with traffic transmissions according to various embodiments.

FIG. 8 illustrates a process for a hitless handover of communications in a Radio Frequency (RF) according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Hitless Satellite-to-Satellite Handover Context

The present teachings disclose a system, methods, and apparatuses to provide hitless satellite-to-satellite handover by using a phased array antenna within a terminal apparatus. The teachings are applicable for a satellite constellation that is moving with respect to the terminal or a terminal that is moving with respect to a satellite, for example, in a constellation in low Earth orbit, for example at 60-1200 miles altitude, typically called a LEO constellation. This is also applicable for a medium Earth orbit constellation, for example, at 1200-20000 miles altitude, typically called a MEO constellation. Although the term LEO is used for convenience at various points in this description, it must be understood by the reader that the description is equally applicable for MEO and other moving satellite constellation configurations, and for hybrid constellations including LEO, MEO and even geosynchronous orbit satellites. For example, this description is applicable for other moving satellite constellations, including constellations that operate at varying altitudes, i.e., with satellites in elliptical orbit around the Earth, sometimes being closer and sometimes being farther from the Earth.

An inroute transmission is everything transmitted by a VSAT to a gateway or a network operations center (NOC). An outroute transmission is everything received by a VSAT from a gateway or a NOC. For the present teachings, inroute refers to a terminal transmission path rather than a particular carrier, that path possibly having multiple eligible return carrier frequencies, any or none of which might be allocated for use by a given terminal at a given time; inroute is not constrained to mean a single carrier frequency.

Figure 1A:
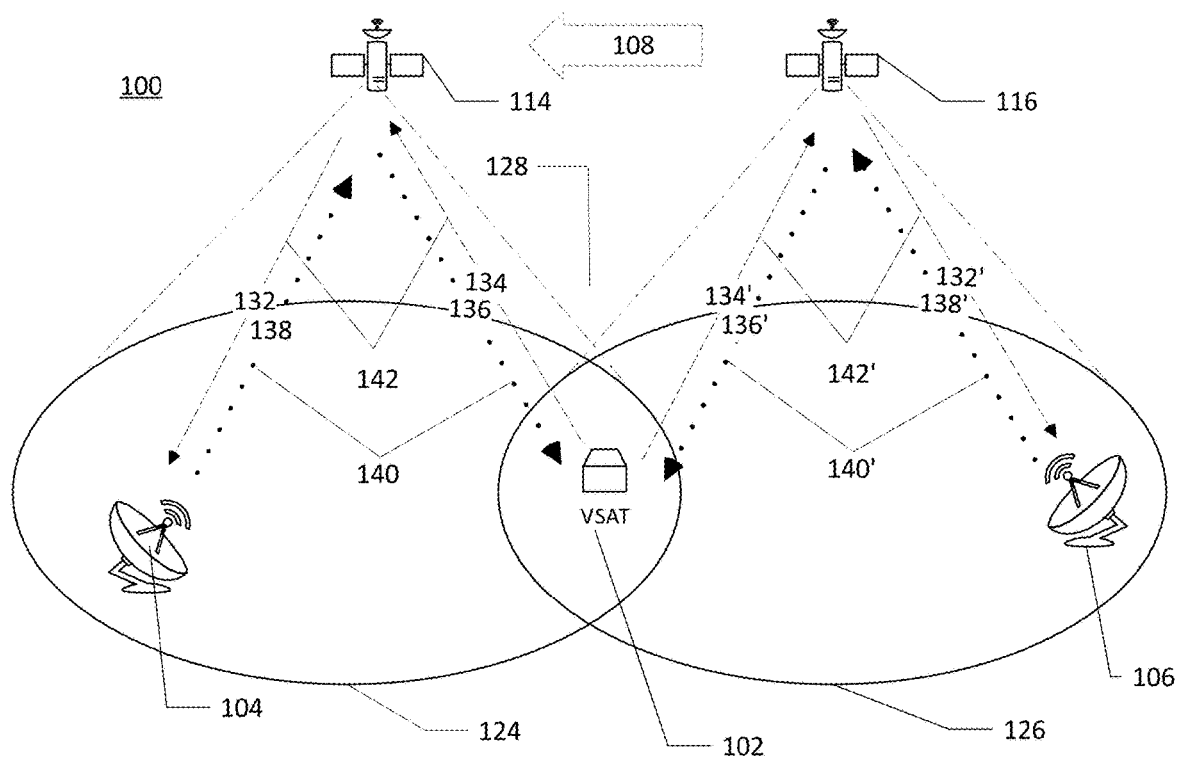
FIG. 1a illustrates an exemplary Low Earth Orbit (LEO) system with a Very Small Aperture Terminal (VSAT) according to various embodiments.

FIG. 1a illustrates an exemplary Low Earth Orbit (LEO) system with a Very Small Aperture Terminal (VSAT) according to various embodiments.

FIG. 1a illustrates an exemplary LEO system 100, with a terminal or VSAT 102 communicating with a gateway 104 via a setting LEO satellite 114 moving with respect to a location of the VSAT 102 such that the VSAT 102 will be imminently out of a coverage area 124 of the LEO satellite 114. Such a satellite might be termed a "setting" satellite with respect to that VSAT, in an analogous way that the Sun might be viewed as setting with respect to a given location on the Earth. The terms "setting" and "rising" for satellites may be used with respect to a VSAT location, a gateway location, an inroute or an outroute. The VSAT 102 may be within a coverage area 126 of a rising LEO satellite 116, in other words, the VSAT 102 is disposed at an intersection or overlap 128 of the coverage area 124 and the coverage area 126. The LEO satellite 116 might be said to be "rising" with respect to the VSAT 102, analogous to the rising Sun. An arrow 108 in FIG. 1a indicates a direction of travel of the LEO satellites 114, 116.

The LEO satellite 116 may be served via the gateway 104, in other words, the same gateway 104 may serve the LEO satellites 114 and 116. The LEO satellite 116 may be served via a gateway 106, in other words, different gateways may serve the LEO satellites 114 and 116. The gateway 104 may be connected to the gateway 106 via a terrestrial link. In some embodiments, the gateway 104 may be connected to the gateway 106 via a satellite link. Use of gateway 104 or 106 may depend on gateway locations and their visibility to a respective satellite.

The VSAT 102 and the gateway 104 may communicate with the LEO satellite 114 via uplinks 134, 138 and downlinks 132, 136. The links 132, 134, 136, 138 may use spot beams provided by the LEO satellite 114 for coverage of specified cells, where the VSAT 102 and/or gateway 104 is disposed. Transmissions from the gateway 104 to the VSAT 102 use the uplink 138 and the downlink 136; the group of links (links 138, 136) used to communicate from the gateway 104 to the VSAT 102 maybe referred to as a forward link or setting outroute 140. Transmissions from the VSAT 102 to the gateway 104 use the uplink 134 and the downlink 132; the group of links (links 134, 132) used to communicate from the VSAT 102 to the gateway 104 maybe referred to as a return link or setting inroute 142.

In some embodiments, to maintain communication continuity, each of the communication paths, namely the setting outroute 140 and the setting inroute 142, may be handed off from the setting LEO satellite 114 to the rising LEO satellite 116 to form a rising outroute 140' and a rising inroute 142'. The rising outroute 140' and rising inroute 142' may use links 132', 134', 136', 138' between the VSAT 102 and the gateway 106 via the LEO satellite 116. In addition to switching satellites, communication flows using the setting outroute 140 and the setting inroute 142 may be handed off from the gateway 104 to the gateway 106. In some embodiments, the present teachings are not limited to VSAT systems.

Communications signals transmitted to/from the VSAT 102 can be any combination of standard or proprietary waveforms, for example, a DVB-S or DVB-S2 standard. The gateways 104, 106 may be connected to any combination of communications networks, such as, intra-nets, internets, or the Internet. In exemplary embodiments, the LEO satellites 114, 116 may be in communication with more than one of the gateways 104, 106. In some embodiments, the gateways 104, 106 may be in communication with more than one of the LEO satellites 114, 116.

In some embodiments, the VSAT 102 of FIG. 1a may be a mobile VSAT, for example, a VSAT disposed in a moving aircraft, in other words, the VSAT is moving with respect to both the setting and rising satellites. Additionally, a satellite may create a set of spot beams (not shown) to service VSATs within a coverage area. As such, a relative movement between the VSAT and the satellite may necessitate a handoff of the VSAT communication path from a first spot beam to a second spot beam of the same satellite. Furthermore, the satellites might be communicatively connected by inter-satellite links (ISLs) (not shown). An ISL is a satellite-to-satellite communication path for selective relay of traffic across the constellation to reach an intended ground station, for example, a gateway or another VSAT. For such an ISL, simultaneous reception via two satellites and transmission via one satellite is applicable. However, a transition from one gateway to another may be unnecessary when an ISL is used to maintain multi-hop connectivity to the same gateway.

In some embodiments, the present teachings may be used for mobile VSATs communicating through a geosynchronous (GEO) satellite. A GEO satellite may orbit the Earth at an altitude of approximately 22,200 miles and with angular velocity aligned to the rotation of the Earth. As such, the GEO satellite appears to remain in approximately the same position in the sky, relative to points on the ground. When a mobile VSAT travels from a service coverage area of a GEO satellite and into another GEO satellite's service coverage area, communication continuity during the transition may be provided with a handover of a setting path to a rising path.

Figure 1B:
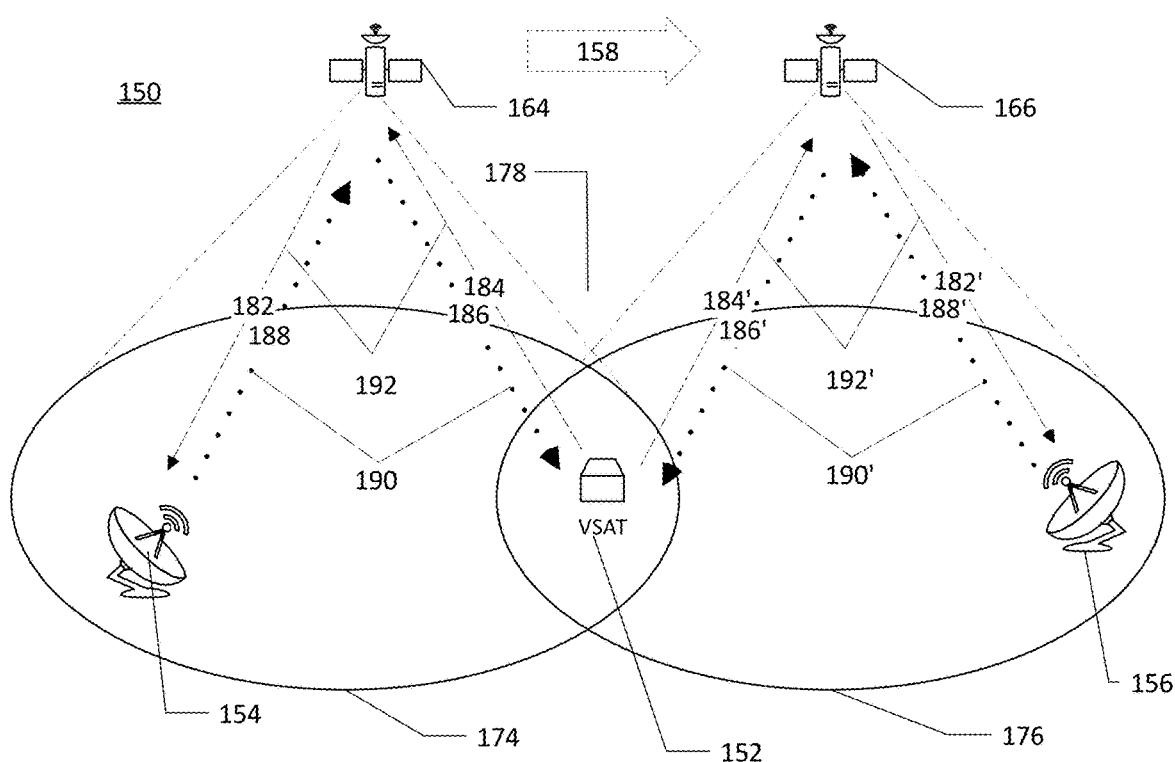
FIG. 1b illustrates an exemplary Geosynchronous Earth Orbit (GEO) system with a VSAT according to various embodiments.

FIG. 1b illustrates an exemplary Geosynchronous Earth Orbit (GEO) system with a VSAT according to various embodiments.

FIG. 1b illustrates an exemplary GEO system 150, with a mobile VSAT 152 communicating with a gateway 154 via a GEO satellite 164 and the VSAT 152 moving with respect to the coverage area 174 of the satellite 164 such that the VSAT 152 will be imminently out of a coverage area 174 of the GEO satellite 164. Such a satellite might be termed a "setting" satellite with respect to that VSAT. The VSAT 152 may be within a coverage area 176 of a rising GEO satellite 166, in other words, the VSAT 152 is disposed an intersection or overlap 178 of the coverage area 174 and the coverage area 176. The satellite 166 might be said to be "rising" with respect to the VSAT 152. An arrow 158 in FIG. 1b indicates a direction of travel of the VSAT 152.

The VSAT 152 and the gateway 154 may communicate with the GEO satellite 164 via uplinks 184, 188 and downlinks 182, 186. The links 182, 184, 186, 188 may use spot beams provided by the GEO satellite 164 for coverage of specified cells, where the VSAT 152 and/or gateway 154 is disposed. Transmissions from the gateway 154 to the VSAT 152 use the uplink 188 and the downlink 186; the group of links (links 188, 186) used to communicate from the gateway 154 to the VSAT 152 form a forward link or setting outroute 190. Transmissions from the VSAT 152 to the gateway 154 use the uplink 184 and the downlink 182; the group of links (links 184, 182) used to communicate from the VSAT 152 to the gateway 154 form a return link or setting inroute 192.

In some embodiments, to maintain communication continuity, each of the setting outroute 190 and setting inroute 192 may be handed off from the setting GEO satellite 164 to the rising GEO satellite 166 to form a rising outroute 190' and rising inroute 192' to the VSAT 152. The rising outroute 190' and rising inroute 192' may use links 182', 184', 186', 188' between the VSAT 152 and the gateway 156 via the GEO satellite 166. In addition to switching satellites, the setting outroute 190 and setting inroute 192 may be handed off from the gateway 154 to the gateway 156. In some embodiments, the present teachings are not limited to VSAT systems.

Communications signals transmitted to/from the VSAT 152 can be any combination of standard or proprietary waveforms, for example, a DVB-S or DVB-S2 standard. The gateways 154, 156 may be connected to any combination of communications networks, such as, intra-nets, internets, or the Internet. In exemplary embodiments, the GEO satellites 164, 166 may be in communication with more than one of the gateways 154, 156. In some embodiments, the gateways 154, 156 may be in communication with more than one of the GEO satellites 164, 166.

Although the terms "rising" and "setting" satellites used in the LEO example above don't necessarily apply for a GEO satellite, it should be understood by the reader that the LEO and GEO handover operations are at least somewhat analogous, i.e., through motion of either satellites or VSAT or both. In such systems, VSAT communications must be handed over from a path through one satellite to a path through another satellite. The terms rising and setting also apply to MEO satellites and High-Altitude Platforms. Consequently, it is intended that any use of terms "setting" and "rising" in the disclosure is not restrictive, and conveys firstly a satellite (or high-altitude platform) through which a terminal has been communicating and secondly a satellite (or high-altitude platform) to which a terminal must transition communication.

Applicable VSAT Configurations

In some embodiments a VSAT may include an antenna system including a phased array antenna to simultaneously receive signals from two satellites in different orbital locations. In some embodiments, the VSAT may transmit, optionally simultaneously, to one or more of those satellites. The transmissions and receptions may be concurrent. In some embodiments a single active transmit path at a time is used. In some embodiments, dual active transmit paths may be used simultaneously.

Figure 2:
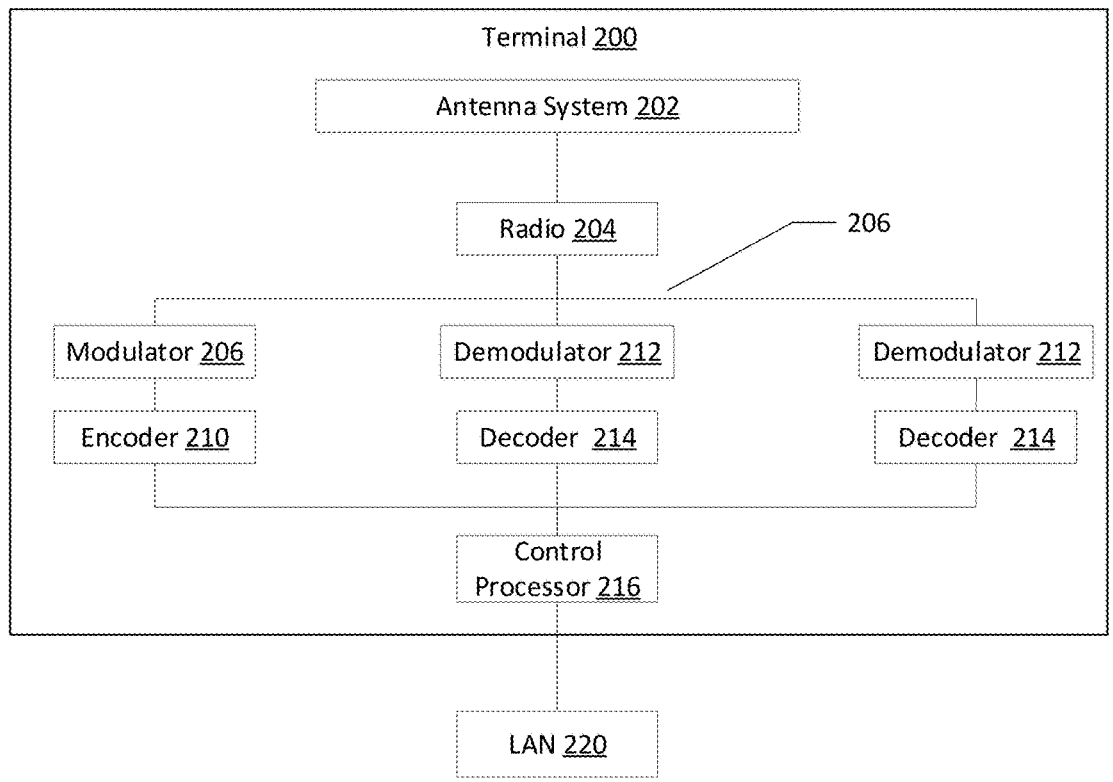
FIG. 2 illustrates a logical view of an exemplary VSAT according to various embodiments.

FIG. 2 illustrates a logical view of an exemplary VSAT according to various embodiments.

A VSAT 200 may include a phased array antenna system 202 to point at and receive signals from at least two satellites in different orbital positions concurrently. The array antenna system 202 may at the same time transmit to at least one of the two satellites concurrent with the indicated dual reception. The VSAT 200 may include radio electronics 204 to receive and transmit at the required frequency bands, an encoder 210 coupled to a modulator 208 for transmission, at least two demodulators 212 coupled to corresponding decoders 214 for reception, and a control processor 216 for protocol and control processing. The control processor 216 may service a Local Area Network (LAN) 220 and any devices connected thereto.

The VSAT may include other components and connectivity necessary for satellite and LAN communication not directly referenced here, but the present teachings apply equally to further VSAT configurations not illustrated, for example, an integrated outdoor enclosure housing the radio, modulator, encoder, demodulators, decoders, and protocol processing or relay within a single package. In some embodiments, a VSAT may have to transition between beams of different polarization, for example, between adjacent beams of a given satellite or for beam transitions between satellites. The antenna and radio may support the needed dual pole simultaneous receive operation with associated independent electronic pole selection for each receive path. The VSAT may include uplink electronic polarization selection and switching, antenna, radio and modem operation in the supported frequency bands of the associated satellites.

Figure 3A:
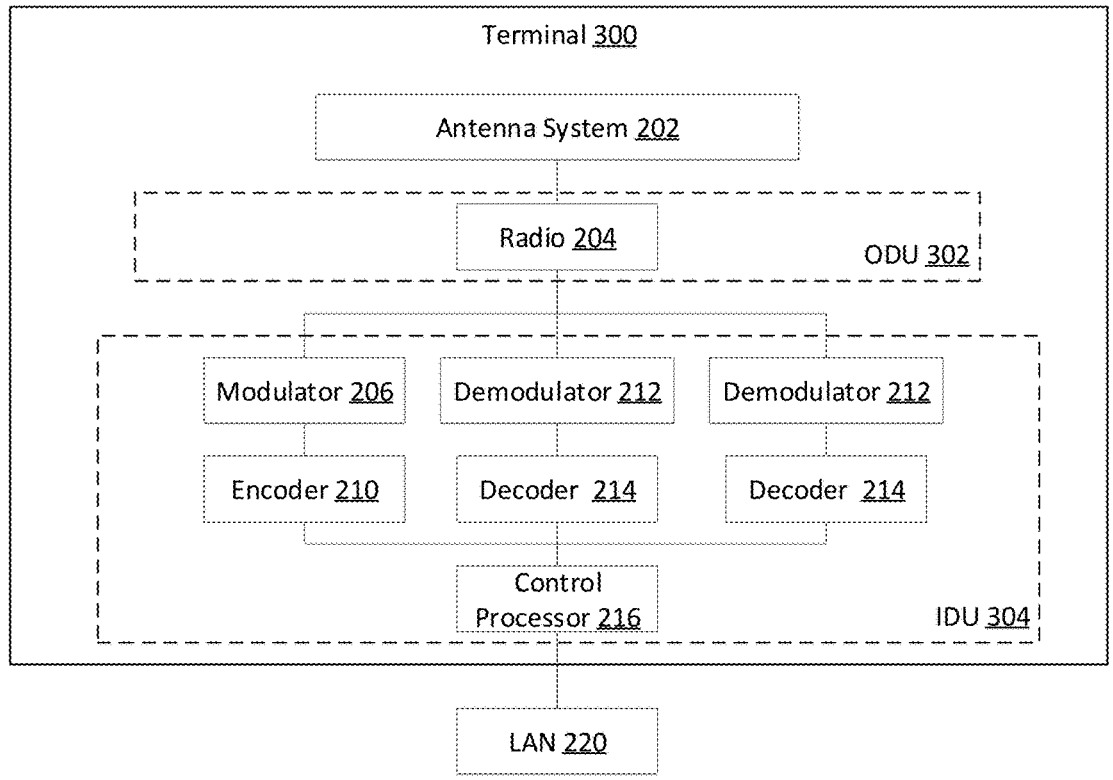
FIG. 3a, FIG. 3b and FIG. 3c illustrate exemplary VSAT configurations according to various embodiments.
Figure 3B:
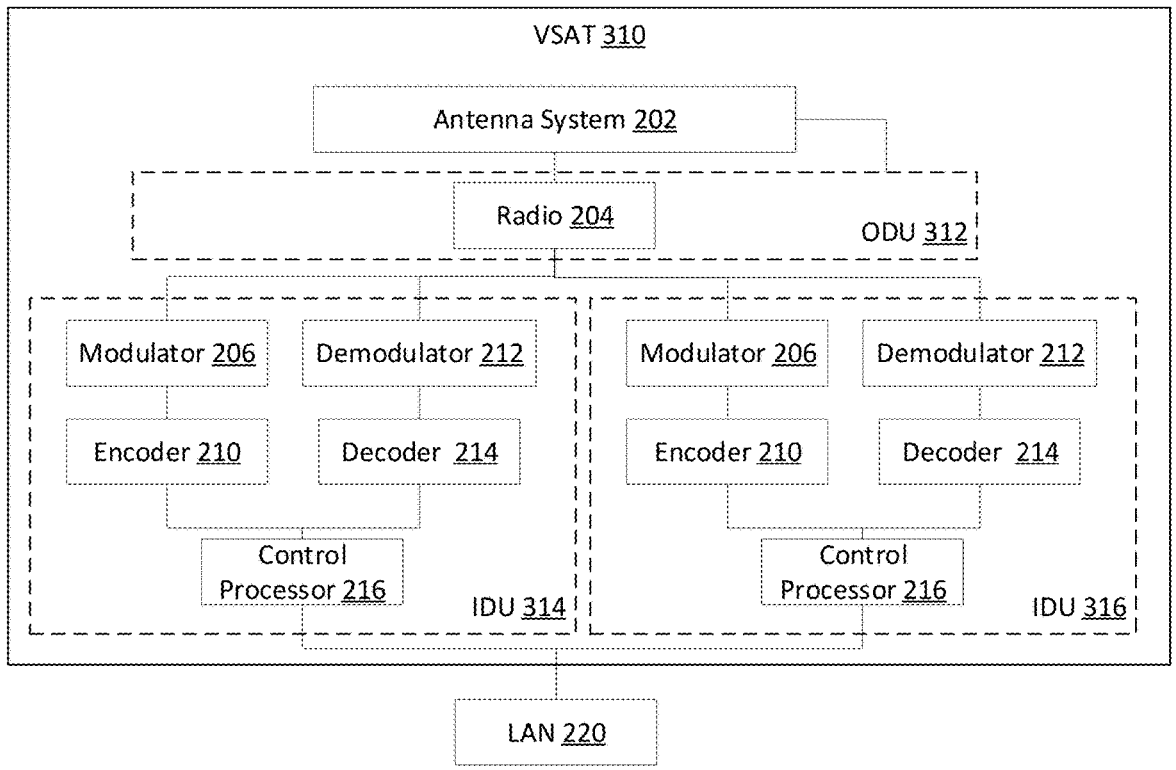
Figure 3C:
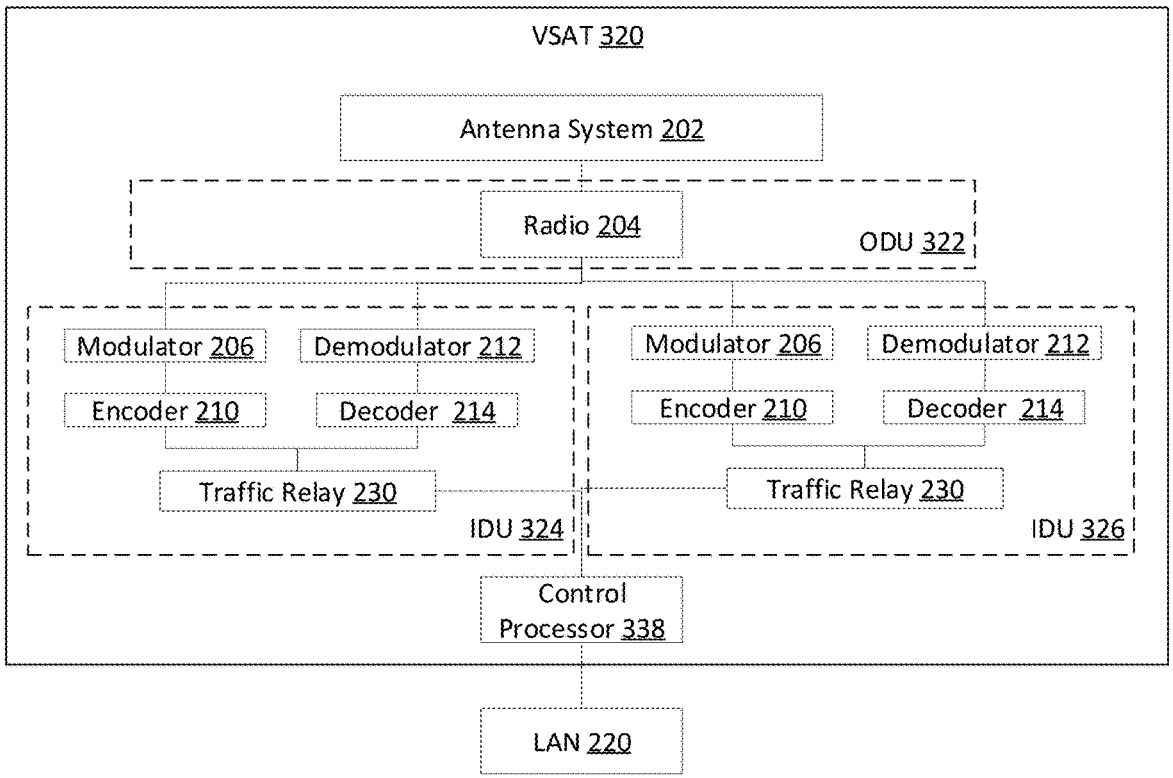

FIG. 3a, FIG. 3b and FIG. 3c illustrate exemplary VSAT configurations according to various embodiments.

FIG. 3a illustrates a VSAT 300 including a phased array antenna system 202, an outdoor unit (ODU) 302 including the radio, and an indoor unit (IDU) 304 including an encoder/modulator, dual demodulators/decoders and a control processor. The IDU 304 may be connected to the LAN 220.

FIG. 3b illustrates a VSAT 310 including the phased array antenna system 202, an ODU 312 including the radio, and dual IDUs 314/316, where each of the IDUs includes an encoder 210, a modulator 206, a demodulator 212, a decoder 214 and a control processor 216. The control processor 216 of IDU 314 may be used to relay traffic to/from the control processor 216 of IDU 316 to perform common protocol processing. The control processor 216 of IDU 314 or IDU 316 may be connected to the LAN 220.

In the embodiment of FIG. 3c, a VSAT 320 may include a phased array antenna system 202, an ODU 322 including the radio, a first IDU 324 and a second IDU 326 each including an encoder/modulator, demodulator/decoder and traffic relay 230 processing. Each IDU may be connected to a control processor 338. The control processor 338 may connect to a LAN 220.

Applicable Gateway Configurations

A VSAT communicates through a satellite (relay) to a gateway directly or indirectly connected to one or more terrestrial networks (for example, the public Internet, private intranets, interconnect trunks, terrestrial mobile communication infrastructure such as for 3G/4G/5G service, or other networks). This connection might be direct when an interconnect is co-located at the gateway site along with an antenna and radio frequency (RF) equipment, or indirect when the interconnect is provided through a separate site connected to the gateway site with antenna and RF equipment.

FIG. 4a, FIG. 4b, FIG. 4c, FIG. 4d, and FIG. 4e illustrate exemplary gateway configurations according to various embodiments. FIG. 4a, FIG. 4b, FIG. 4c, FIG. 4d, and FIG. 4e are not intended to show all elements of a Gateway. For example, internal switching, redundancy control, IF distribution, other components and subsystems are omitted from the illustrated gateway for visual simplicity.

Figure 4A:
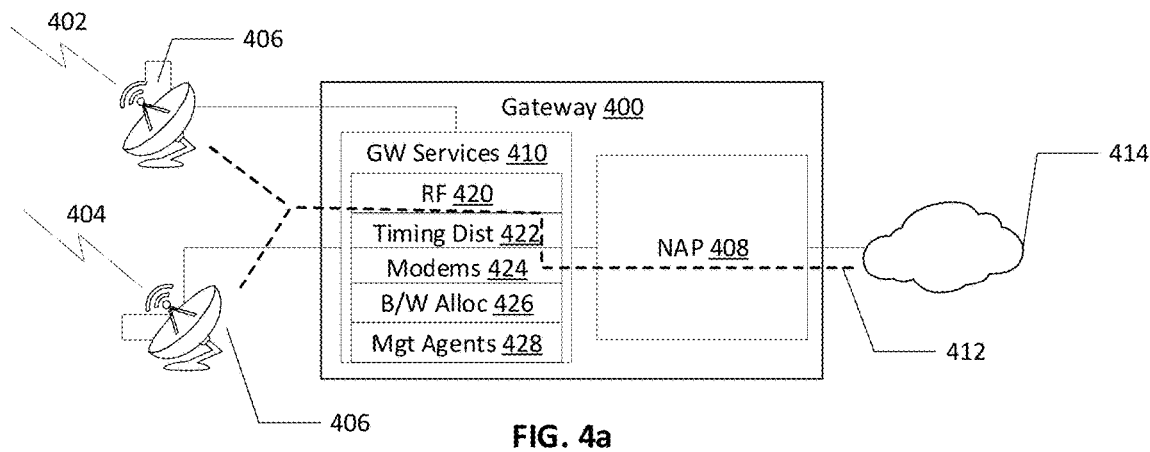

FIG. 4a illustrates a dual-satellite gateway 400 that provides a VSAT (not shown) with a communication service through a setting satellite 402 and a rising satellite 404 via one or more antenna systems 406. An antenna system may include an antenna, associated amplifiers, frequency conversion and other equipment. The antenna may be a parabolic dish, a phased array antenna or the like. The dual-satellite gateway 400 may include gateway services 410. The gateway services 410 may provide services such as RF control 420, timing distribution 422, modems 424, bandwidth allocation 426, management agents 428 and the like. The gateway services 410 may connect to a Network Access Point (NAP) 408 that maybe a logical or physical construct. In exemplary embodiments, the NAP 408 may include a collection of components and subsystems to connect with an external network 414. The NAP 408 may connect to the external network 414 by providing any associated necessary protocol services, such as, routing, firewall, compression, deep packet inspection, traffic classification and shaping, protocol acceleration/optimization, Domain Name Service (DNS) service, or the like. As a VSAT (not shown) is handed over from the setting satellite 402 to the rising satellite 404, a traffic path 412 (shown by dotted lines) through the dual-satellite gateway 400 transitions from one of the antenna systems 406 to another of the antenna systems 406. The NAP 408 need not be co-located with the gateway 400, but is shown as a logical construct here to differentiate exemplary FIG. 4a example from FIG. 4b. The external network 414 may be a terrestrial network, an enterprise network, a telephony network, a cellular network, the Internet or the like.

Figure 4B:
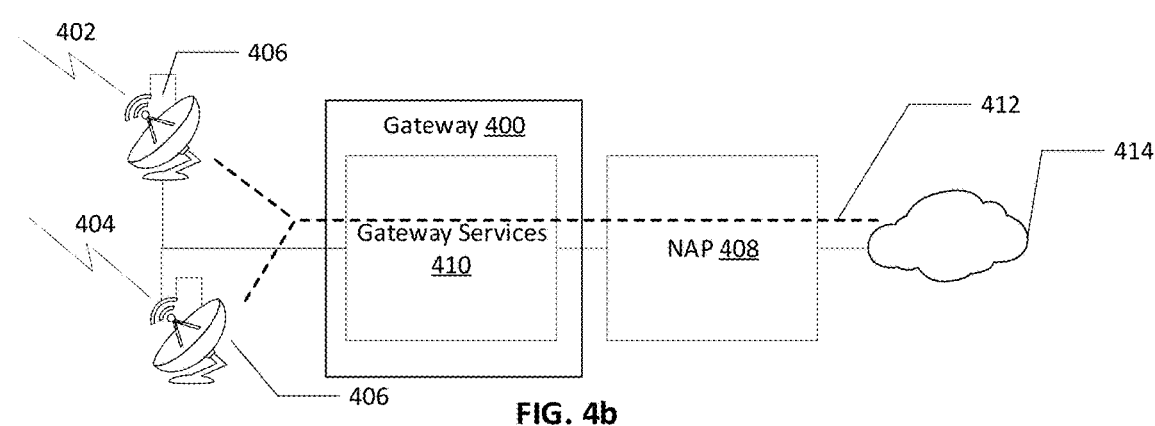

FIG. 4b is like FIG. 4a, except that the NAP 408 and/or the external network 414 are located remote from the dual-satellite setting gateway. As such, the traffic path 412 flows between the remotely disposed NAP 408 and the gateway 400. In some embodiments, some of the gateway services 410 shown as included in the gateway 400 of FIG. 4b may be co-located with the NAP 408.

Figure 4C:
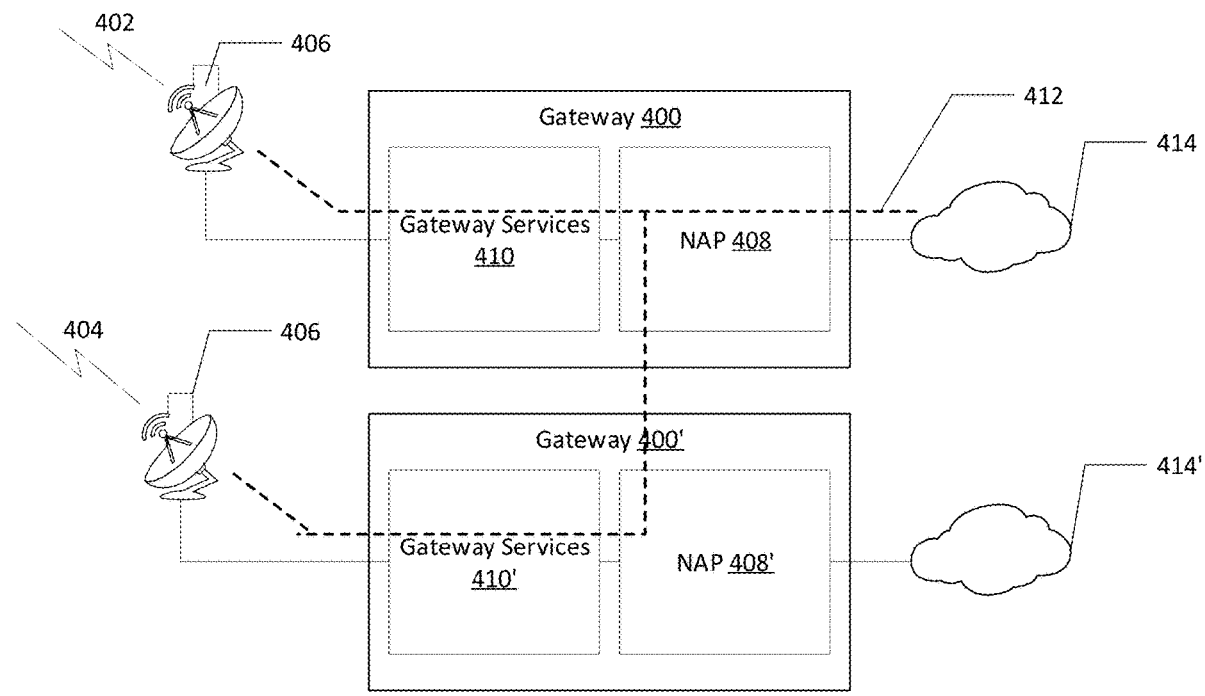

FIG. 4c illustrates an exemplary embodiment including two different Gateways to provide a VSAT with communication services, a gateway 400 for a setting satellite 402, and a gateway 400' for a rising satellite 404. For example, it might be that the rising satellite 404 location is such that it is not visible from gateway 400 providing service to the VSAT (not shown) through the setting satellite 402, and a satellite handover of the VSAT must coincide with a gateway handover of the VSAT to Gateway 400'. Even though there is a NAP 408' associated with the gateway 400', the traffic path 412 connection point to the external terrestrial network 414 may remain constant so that any addressing and protocol acceleration contexts are maintained through the handover. As such, the pre-handover traffic path 412, between gateway services 410 and NAP 408, is redirected from the gateway services 410' of the gateway 400' to the NAP 408 by the NAP 408' as illustrated. In some embodiments, the traffic path 412 may circumvent NAP 408' and go directly between NAP 408 and gateway 410' (not shown).

Figure 4D:
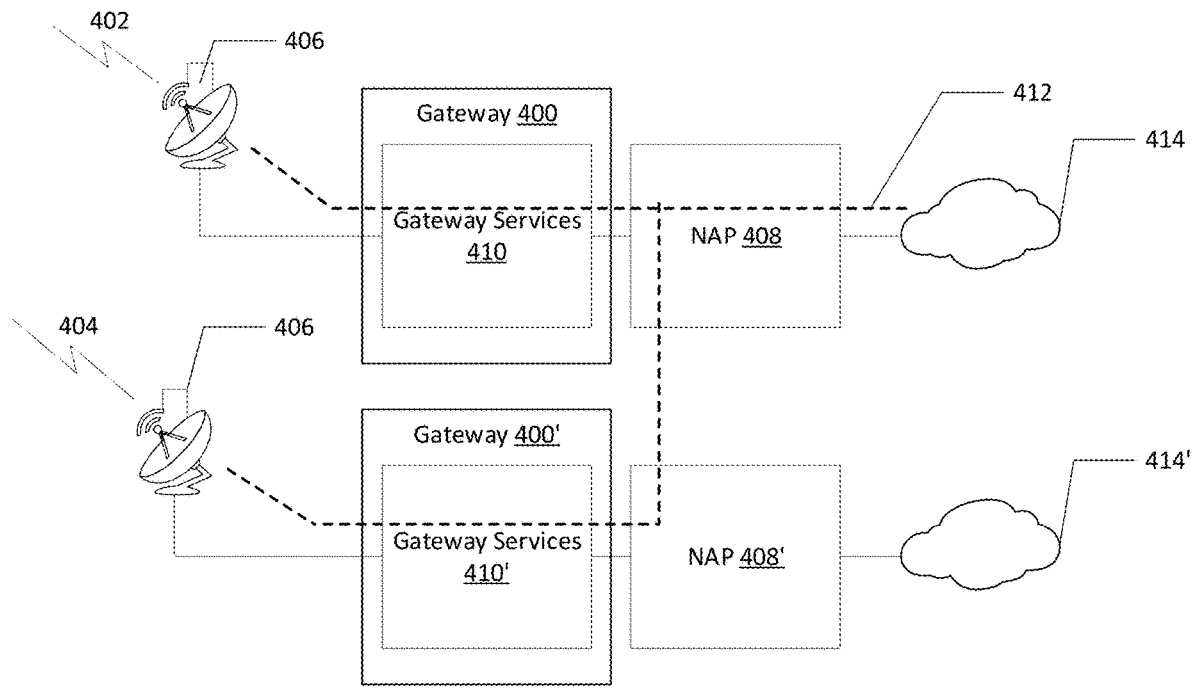

FIG. 4d is like FIG. 4c, except that a NAP function for each Gateway is located at a different site from each Gateway.

Figure 4E:
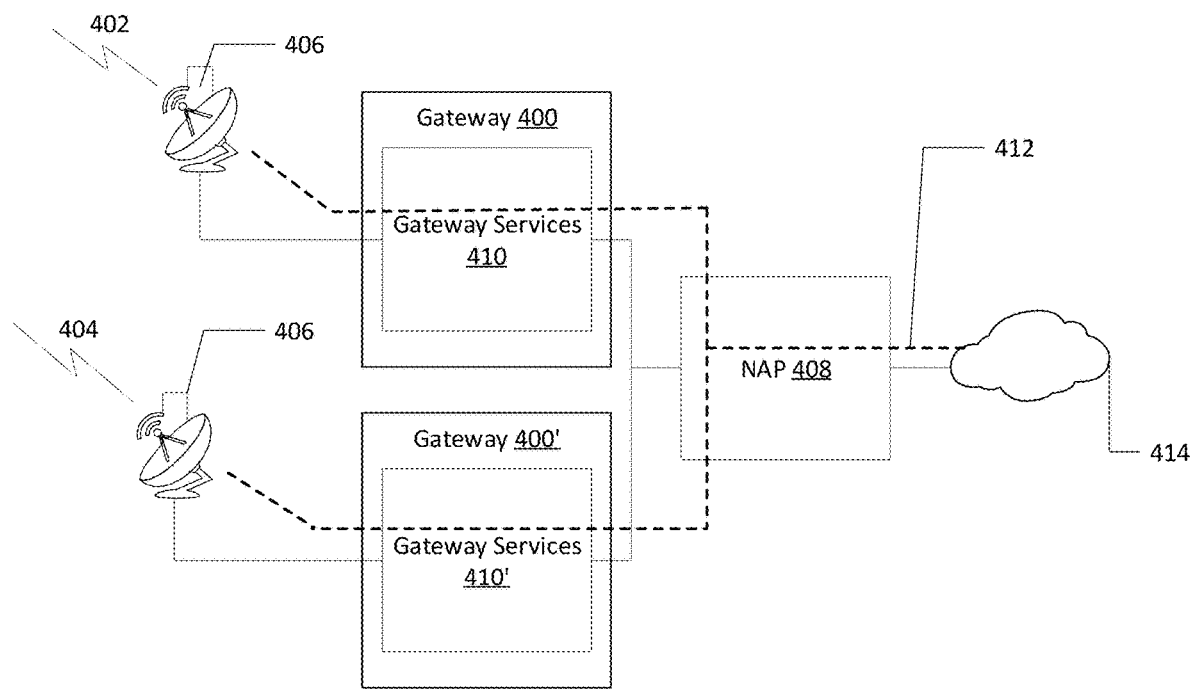

FIG. 4e is like FIG. 4c, except that the NAP 408 is common between the gateways 400 and 400'. As such, redirection of the traffic path 412 only needs to switch from gateway 400 to gateway 400' and a redirection to a different NAP is eliminated. The NAP 408 may be common to gateways 400 or 400' and provided at a separate site or be co-located with either or both of the gateways 400 or 400'. The gateways 400 or 400' may be located at separate sites or may be co-located.

These examples are not intended to be exhaustive, and other configurations may be envisioned that are also applicable. For example, a given Gateway site might be paired with one or more other sites for redundancy, in 1:1 or m:n relationships, or a diverse antenna site might be connected to a given Gateway in addition to a local antenna, for rain fade diversity. As noted above, further configurations, partitioning of functionality, components and subsystems are possible. Components and subsystems may include timing and power systems, redundant equipment and control systems, facilities and environmental systems, management and control systems, or the like.

Summary of Hitless Handover Sequence

The following describes a high-level sequence of transitions and operations to provide the hitless satellite-to-satellite handover of the present teachings. This initial sequence description is simplified to aid the reader to understand the basic concept; then, further potential actions and optimizations are described, applicable depending on the system and traffic path characteristics. Collectively, these descriptions provide sufficient detail to enable persons knowledgeable in the field to understand and implement hitless handover.

FIG. 5 illustrates a satellite network providing for a satellite-to-satellite handover according to various embodiments.

FIG. 5 illustrates a satellite network 500 including a gateway 502, a gateway 520, a setting satellite 504, a rising satellite 506, a VSAT 514, a NAP 510 and a terrestrial network 512. The satellite network 500 effects the hitless handover of VSAT 514 from setting satellite 504 to rising satellite 506, with transition of the VSAT 514 from a communication path using outroute 516 and inroute 518, to a communication path using outroute 516' and inroute 518' in the following order:

Maintain an outroute 516 and an inroute 518 from VSAT 514 to gateway 502 via satellite 504

At switchover moment, establish the outroute 516' via gateway 520 and satellite 506, signaling the NAP 510 to redirect the forward communication path flow for VSAT 514 to outroute 516' via gateway 520 and satellite 506, while VSAT 514 continues to receive already in-transit forward traffic on outroute 516 via gateway 502 and satellite 504, and continues to use inroute 518 via gateway 502 and satellite 504 for return path communication After having confirmed redirection of forward traffic through outroute 516' via gateway 520 and satellite 506, establish the inroute 518' via gateway 520 and satellite 506, and redirect return traffic for VSAT 514 to the NAP 510 via inroute 518' and gateway 520

Continue to use outroute 516 via gateway 502 and setting satellite 504, simultaneously with outroute 516' via gateway 520 and rising satellite 506, until all in-transit traffic through the setting satellite path (from NAP 510 to outroute 516) has been received Release the outroute 516

To begin, the VSAT 514 including a phased array antenna may use an RF communication path 508 for receiving and transmitting via a setting satellite 504. A forward traffic flow from a terrestrial network 512 to the LAN 220 connected to the VSAT 514 is illustrated with directional arrows along the outroute 516. The forward traffic flow enters a NAP 510, is forwarded to a gateway 502, and from there up to the setting satellite 504, and then down to the VSAT 514. The VSAT 514 receives the forward traffic flow through the phased array antenna, radio, demodulator, decoder, to the protocol processor, and ultimately to the LAN 220. A return traffic flow from the LAN 220 to the terrestrial network 512 is shown by dotted lines with directional arrows pointing along the inroute 518. This return traffic flow enters from the LAN 220 and goes to the VSAT 514. Within the VSAT 514, the return traffic flow flows thru, in order, a protocol processor, an encoder, a modulator, and a radio connected to a phased array antenna, to be uplinked to the setting satellite 504. The gateway 502 receives the traffic flow, from which it flows to the NAP 510 and on to the terrestrial network 512.

For illustrative purposes, the VSAT 320 of FIG. 3c is used in FIG. 5. The gateway 502, NAP 510 and VSAT 514 each may be any applicable configuration discussed above, including configurations not illustrated. The setting satellite 504 and the rising satellite 506 may be LEO, MEO or GEO satellites, satellites in some other orbit (e.g., elliptical), or High-Altitude Platforms (HAPs).

A rising satellite 506 may be visible to the VSAT 514 via an RF communication path 522, where the RF communication path 522 is available to be established when a switchover moment for the VSAT 514 is imminent. In some embodiments, a satellite to satellite handover may be orchestrated for the VSAT 514. The switchover moment maybe determined by the VSAT 514, the gateway 502, the gateway 520, the NAP 510 or some other control system in the satellite network 500. During a switchover, the VSAT 514 configures its antenna to acquire the RF communication path 522 to the rising satellite 506, while continuing to communicate through the setting satellite 504. The VSAT 514 acquires (i.e., receives) a forward channel 516' through the rising satellite 506 into a second demodulator and decoder, while continuing to receive the forward channel 516 through the setting satellite 504 via the RF communication path 508 into the first demodulator and decoder. Additionally, the VSAT 514 continues to transmit its return traffic through the setting satellite 504 uplink 518 and on to the gateway 502, using return bandwidth the VSAT 514 requests (or has previously requested or been assigned) and is allocated for the setting satellite 504 and the gateway 502. Such return bandwidth allocation for setting satellite 504 may be conveyed to VSAT 514 from gateway 502 via outroute 516.

After establishing the outroute 516', the VSAT 514 then signals the NAP 510, via the return channel 518, to redirect forward traffic for the VSAT 514 to go through the gateway 520 and the satellite 506. Additionally, the VSAT 514 continues to communicate (receive and transmit) through the setting satellite 504. In doing so, the VSAT 514 antenna, demodulators and decoders may be configured such that traffic from both receive channels (i.e., outroutes 516 and 516') is forwarded to its own protocol processing agent. This accounts for a transition period starting at when the redirect traffic request is sent from the VSAT 514 until the NAP 510 implements the redirect traffic request and all already in transit forward traffic has been delivered via setting satellite 504. As such, the outroute 516 is used to forward traffic already queued, in transit or queued during the transition period. During the transition period, in some embodiments, the VSAT 514 may continue to transmit return traffic through the inroute 518, hence, the satellite handover of the VSAT 514 forward and return traffic channels may be intentionally decoupled.

After the VSAT 514 confirms that its forward traffic path has been switched to the outroute 516', the VSAT 514 internally redirects its return traffic path to the rising satellite 506. In some embodiments, the VSAT confirms the switch of the forward traffic path by way of receiving its forward traffic through the outroute 516', or by receiving an acknowledgement signal from the NAP 510 via the outroute 516'. The VSAT 514 may include a second modulator and a second encoder for use by a redirected return traffic path. In some embodiments, the VSAT 514 may have a single modulator and encoder, and the VSAT 514 may redeploy the single modulator and encoder for the inroute 518'. The VSAT 514 might continue to receive some in-transit traffic via the setting satellite 504, for example, to eliminate a race condition due to speed, latency or congestion while completing the switchover. Additionally, there may be some return traffic still in transit via the setting satellite 504 at the time the VSAT 514 switches its uplink transmission to the rising satellite 506.

At some point later to account for the possible forward traffic race condition noted above, possibly when the VSAT 514 control processor has determined from embedded sequence numbers or otherwise that all forward traffic through the outroute 516 has been received, or perhaps based on a suitable elapsed time, the VSAT 514 stops tracking the setting satellite 504, continues tracking the rising satellite 506, and stops demodulating and decoding the outroute 516.

The VSAT 514 may simultaneously receive from two satellites, thereby enabling a decoupling of satellite-to-satellite handovers of the forward and return traffic channels of the VSAT 514. There are several lower level operations and optimizations that might also be applicable depending on the system. These are:

Handling out-of-order packet delivery during the hitless handover transition
Optimizing forward link/channel operation during the hitless handover transition
Optimizing return link/channel operation during the hitless handover transition
Handling of packet loss during the hitless handover transition
Establishing Gateway communication path context for the new path Handling Out-of-Order Packet Delivery During the Hitless Handover Transition The switchover sequence might result in packets being received out of order in either the forward or return direction. The term "packet" is used as a convenience in this disclosure to denote an aggregate unit of end-user data for delivery through the satellite system, or for a control signaling message internal to the system. The term packet is not intended to imply a protocol or application. In some embodiments, a continuous data stream might be partitioned into discrete packets for delivery through a satellite-based transit network.

Forward Link Operation: The VSAT 514 may be configured to receive traffic from both the setting satellite 504 and the rising satellite 506. With this configuration, the VSAT 514 receives traffic in transit over the outroute 516, and receives new traffic over the outroute 516'. This does away with the assumption the in-transit traffic via the setting satellite 504 will be received and processed by the VSAT 514 prior to receipt of any new traffic via the rising satellite 506 traffic, due to, for example:

Possible differing queuing delays in exit from the NAP 510 on the gateway 502 path versus the gateway 520 path;
Possible differing latency on the path from the NAP 510 to the gateway 502 versus the path from the NAP 510 to the gateway 520;
Possible different queuing delays, bandwidth availability or channel configurations for the gateway 502 forward carrier versus the gateway 520 forward carrier; and
Other processing or propagation effects.

Return Link Operation: At the time the VSAT 514 switches its return traffic path, there might be return traffic still in transit over the inroute 518 path to the NAP 510, and it cannot be assured that all such in transit traffic will be received and processed at the NAP 510 prior to any traffic through the new inroute 518', due to, for example:

Possible different processing delays in exit from the gateway 502 path versus the gateway 520 path;
Possible different queuing delays and latencies from the gateway to NAP for the inroute 518 path versus the inroute 518' path;
Possible different input queue depths for traffic entering the NAP 510 for input from gateway 502 versus gateway 520; and
Other processing or propagation effects.

In some embodiments, proper traffic order can be recovered and verified through the insertion and checking of packet sequence numbers. In some embodiments, proper traffic order may be built into a satellite delivery protocol, irrespective of satellite handover, when, for example, there are other conditions that might cause packet reordering independent of handover. When order maintenance is not always integral to the satellite delivery protocol design, special measures might be defined as part of the hitless handover process to ensure proper delivery order.

FIG. 6 illustrates a process for handling out of order packet delivery during a hitless satellite-to-satellite handover according to various embodiments.

FIG. 6 illustrates a process 600 that might be applied to maintain delivery order between entry to and exit from a satellite network across satellite handovers within a receiving side (e.g., VSAT for forward direction traffic, NAP for return direction traffic). There may be some system-specific received traffic handling processes beyond those shown in FIG. 6.

Sequence checking may use sequence information added by a sender (the NAP for forward traffic flow and the VSAT for return traffic flow). The sequence information may be checked by the recipient against expected sequence information to detect out of order reception.

Order recovery buffering may be used to correct for out of order receipt. When an incoming packet order check 604 determines that a packet 602 is received in order, by checking for the expected next in sequence, the packet 602 can be forwarded to the incoming packet processing 612. Incoming packet processing 612 may include operations appropriate for the system and its protocols, and include an appropriate update of the expected sequence information 606. However, if the incoming packet order check 604 determines that the packet 602 is out of sequence, the out of order packet 602 may be saved in an order recovery buffer 610 pending receipt of a missing packet or packets. Once the missed packet has been received, the later arriving missed packet might be forwarded for regular incoming packet processing 612, along with any buffered packets in the order recovery buffer 610 that can now be delivered in sequence, with an appropriate update of the expected packet sequence information 608, and possibly clearing or updating an ongoing order recovery timer 608. The order recovery timer 608 may trigger packet order timeout handling 616, if a missed packet is not timely received.

Flow, priority or backbone sequence information differentiation—in some embodiments, the sequence information 606 might span all traffic in a given (forward or return) direction, or the sequence information 606 might be differentiated on a per-flow or per-priority basis. Independent sequencing per flow or per priority enables expedited traffic delivery to the end user so that, for example, a delay or disordering in receiving traffic for a low priority flow does not result in delay in forwarding traffic for a high priority flow. In some embodiments, the low priority traffic is more likely to be received out of order than is high priority traffic, as low priority traffic might be queued for longer if there is some link congestion. If such differentiation is appropriate, then the sending side may include appropriate flow-specific sequence information for different flows, the recipient may maintain separate expected sequence information for different flows, and the order recovery buffering may maintain independence of buffering across flows. When a satellite network specific backbone protocol is used to encapsulate and manage traffic delivery between the VSAT and NAP, the sequence information may be differentiated on a backbone basis.

An order recovery timer may be used when the packet 602 is not the next expected packet in sequence or the next expected packet has been lost in transit (due to some propagation or congestion effect) or the next expected packet did not arrive without some recovery action (such as a non-acknowledgement signal to and retransmission by the sender). A timeout might define the maximum time the recipient will hold the disordered packet (or packets) before taking appropriate action. In packet order timeout handling 616, expiry of such a timer may trigger removal of the timed out out-of-sequence packet(s) from the order recovery buffer 610 for further handling, along with an update of the expected sequence information 606. The removed packets may be forwarded, discarded, or saved elsewhere should the system feature an integral internal acknowledgement/retransmission mechanism, or the lost packet handling action may be the same action performed after a packet loss when there is no satellite handover in progress. These measures are not specific to packet order recovery upon satellite handover and are not shown in FIG. 6 or discussed further here.

Order recovery timer differentiation may be used when in event sequence information 602 is differentiated by flow, priority or backbone. It may be appropriate to differentiate the duration of the order recovery timer 608 per priority to achieve a desired quality of service. For example, a jitter buffer may be used to minimize transit delay variation for conversational class voice traffic, and in hitless satellite handover a shorter order recovery timer 608 may be used for conversational class traffic flows, while flows of other traffic classes use less stringent latency and jitter requirements. The time that traffic is held in an order recovery buffer 610 and the time the traffic is held in the jitter buffer may be coordinated in aggregate so that latency and jitter requirements are met. Jitter buffer handling is not shown in FIG. 6, as such processing is not specific to hitless satellite handover.

Optimizing Forward Link Operation During the Hitless Handover Transition

Forward channel link adaptation processing might be needed for satellite systems, depending on the waveforms, satellite constellation, Gateway and VSAT characteristics and protocols employed. Link adaptation in this context may include timing and frequency synchronization, Doppler compensation for moving satellites and terminals, and the like. For systems employing shared forward channels, per-VSAT link adaptation techniques such as Adaptive Coding/Modulation (ACM) might be optimized. For systems employing dedicated forward channels, channel allocation and link adaptation might be optimized. For example, a VSAT switching from one satellite to another satellite must realign the receive timing from that of the forward channel of the old satellite to that of the forward channel of the new satellite. Such underlying operations are not specific to the hitless handover process. In some embodiments, forward path operations may be optimized to consider the simultaneous forward channel reception from two satellites, concurrent with return path transmission through a single satellite, or which processes might be optimized to avoid traffic flow delays, discontinuities or inefficiencies in the handover process and so make that process hitless. These impacts and opportunities are described below.

Forward Channel Synchronization

Timing and frequency synchronization are integral to any satellite link operation, and a receiving terminal must resynchronize from an old satellite channel to a new satellite channel when effecting a satellite handover. These channels might operate with different waveforms, different carrier bandwidths, independent timing bases, uncoordinated frame or superframe structures, exhibit differing latencies, and be subject to different Doppler effects depending on satellite and terminal motion and locations. In some embodiments, the two demodulators of the VSAT may provide an acquisition time advantage versus using a single demodulator and/or receiving a single forward channel at a time. The terminal can achieve frequency lock and timing recovery for a new satellite channel while continuing to operate with the old satellite channel, and furthermore can receive any needed control information periodically broadcast over the new satellite channel while still operating with the old satellite channel. The two demodulators, decoders and associated link control processing may be sufficiently decoupled to achieve independent synchronization with the two satellite channels. Additionally, in systems for which return channel synchronization is derived from the forward channel, the VSAT may propagate into the return synchronization processes, the synchronization information for whichever of the forward channels is synchronous with return path transmission, and to switch from synchronizing information of the old satellite forward channel to that of the new satellite forward channel upon switching the return path to the new satellite.

Forward Channel Adaptive Coding/Modulation (ACM) for Shared Channels

Some satellite systems employ a shared forward channel to deliver multiplexed traffic to many VSATs within a coverage area, with each packet addressed to the appropriate destination terminal (unicast) or terminals (multicast or broadcast). Per-VSAT optimization can be applied for a shared forward channel by employing adaptive coding and modulation (ACM), wherein packets for a given VSAT are modulated and forward error correction (FEC) encoded to achieve a target link performance for that VSAT. Each VSAT may indicate to the transmitting Gateway (or to a NAP in event the link adaptation is centralized or relayed) either some measured link performance metric, or else a modulation/code point (MODCOD) derived from that metric according to some configured ACM trajectory table or algorithm. This enables the link to be independently optimized to account for both the static attributes (for example, antenna size, antenna and demodulator/decoder characteristics, or the like) and dynamic attributes (for example, terminal location relative to the satellite, specific weather attenuation effect between the satellite and terminal location, weather attenuation in effect between the satellite and Gateway location, or the like) for each VSAT. The link performance metric for a VSAT might be a measured signal energy to noise ratio (Es/No) or some other suitable metric, based on the aggregate forward channel received by the VSAT, rather than on only those packets destined to that VSAT. Digital Video Broadcast Standard Version 2 (DVB-S2) is one standard describing a commonly used per-VSAT optimizable waveform, for which there are also further extensions for a range of operating conditions and waveform options termed Digital Video Broadcast Standard Version 2 Extension (DVB-S2X). The possible employment of a standard, the design of a specific ACM implementation, and the application of appropriate trajectory tables must be achieved irrespective of the hitless handover process described here.

MODCOD management within the context of the hitless satellite handover transition ensures that the appropriate MODCODs are used when the forward traffic path goes through the old (setting) satellite and the new (rising) satellite, and to align the MODCOD switch with the satellite switch such that the appropriate link quality and efficiency are achieved immediately and without a convergence delay upon switching the forward traffic path to the new satellite.

| | Operation | Initial Parameters | Actions |
|---|---|---|---|
| 1 | Initial Condition: VSAT Receiving Forward Traffic from a Single Satellite | VSAT forward channel: Setting satellite<br>VSAT signal metric: Setting satellite<br>VSAT ModCod chosen: Setting satellite<br>VSAT ModCod requested: Setting satellite<br>NAP forwarding: Setting Satellite gateway/Setting satellite/Setting satellite ModCod<br>Gateway (GW) forwarding: Setting Satellite gateway/Setting satellite/Setting satellite ModCod | Track Setting satellite signal quality metric, Signal Setting satellite ModCod adjustments as needed; Monitor for when satellite handover is to be started, and initiate when indicated |
| 2 | VSAT Acquires Second Satellite | No changes from operation 1 | Initialize for Rising Satellite ACM operation; Configure VSAT to receive Rising Satellite forward channel in addition to Setting satellite forward channel |
| 3 | VSAT Determines Signal Quality Metric for Second Satellite | VSAT forward channel Setting Satellite, Rising Satellite<br>No other parameter changes from operation 2 | Track Rising Satellite signal quality metric until stabilizes (and then continue tracking) |
| 4 | VSAT Requests Forward Traffic Handover to Second Satellite | VSAT signal metric: Setting satellite, Rising Satellite<br>No other parameter changes from operation 3 | Determine Rising Satellite target forward ACM ModCod based on Rising Satellite signal quality metric and trajectory table; Send request to NAP (via Setting Satellite (return path) to hand over forward path to Rising Satellite; Include Rising Satellite target ModCod in request |
| 5 | NAP Hands Over Forward Traffic Path to Second Satellite | VSAT ModCod chosen: Rising Satellite<br>VSAT ModCod requested to NAP: Rising Satellite<br>No other parameter changes from operation 4 | NAP receives satellite handover request; NAP changes path for new forward traffic via Rising Satellite Gateway/Rising Satellite/Rising Satellite ModCod |
| 6 | VSAT Receives Forward Traffic from Both Satellites | NAP forwarding: Rising Satellite/Rising Satellite/Rising Satellite ModCod<br>GW forwarding: Rising Satellite Gateway/Rising | Rising Satellite Gateway forwards new VSAT traffic via Rising Satellite using the Rising Satellite ModCod, |

| Operation | Initial Parameters | Actions |
|---|---|---|
| | Satellite/Rising Satellite ModCod<br>No other parameter changes from operation 5 | Setting Satellite Gateway forwards any previously in-transit VSAT traffic via Setting Satellite using Setting Satellite ModCod; VSAT receives forward traffic via both the Setting and Rising Satellites |

The above table illustrates an exemplary ACM MODCOD management process. This example is presented as a sequence of steps performed by the VSAT, NAP and applicable Gateways, where each step is characterized by a set of starting conditions related to forward channel ACM control (i.e., conditions prior to performance of the actions of that given step), and a set of actions performed related to forward channel ACM control. The actions of a given step might establish new starting conditions for the next step as indicated in the table. Other actions might be performed by the VSAT, NAP and Gateways during this sequence for traffic forwarding, link management and control. The above table outlines actions related to forward ACM MODCOD management for a hitless handover.

Operation 1 may be treated as an initial condition for a hitless handover process. Operation 1 may be immediately prior to or at the start of the hitless handover process, during which time a VSAT forward path is operating through the setting satellite and setting gateway, and a forward path unicast traffic to the VSAT is being encoded using a MOD-COD that has been aligned with the receive signal quality metric measured by the VSAT for the setting satellite. In some embodiments, a different but sufficient MODCOD might occasionally be used to encode a given packet for reasons of forward channel code block packing efficiency or for other reasons, without materially changing the MOD-COD management process. This initial condition ends when the VSAT determines it is time to start the satellite handover process. In some embodiments, an ephemeris tracking module within or attached to a Gateway, NAP, or other management system might make such a determination based on knowledge of terminal location and satellite ephemeris status.

At operation 2, the VSAT begins the hitless handover process by reconfiguring its antenna and receive components (one demodulator, one decoder, etc.) to acquire the rising satellite, while maintaining receive and transmit path operations through the setting satellite. The VSAT may initialize parameters as needed to enable it to determine the rising satellite signal quality metric and target the rising satellite MODCOD.

Operation 3 begins when the VSAT starts receiving a rising satellite forward channel concurrently with the setting satellite forward channel. At this time, the VSAT begins to calculate and maintain a forward channel signal quality metric (or set of metrics) for the rising satellite. The forward channel signal quality metric may use some averaging or filtering over time to reach an accurate and stable metric value. This calculation may continue at least until a stable and reliable value is attained. In some embodiments, the VSAT may optionally simultaneously track the setting satellite receive signal metric and the rising satellite receive signal metric. The calculated rising satellite metric might differ in value from the calculated setting satellite metric due to, for example, different weather attenuation and propagation distances for the paths from the two satellites. The difference does not alter the handover process, but it might affect metric convergence time.

Sometime after operation 3, the VSAT requests the NAP to hand over the VSAT forward traffic path to the rising satellite and its associated gateway. With this request, the VSAT may include either the measured signal metric (if the NAP or a connected terrestrial function is used to map to a forward ACM MODCOD), or the rising satellite forward ACM MODCOD determined per the stable rising satellite receive signal metric and a forward ACM trajectory table (for example, as received by management configuration or via control information sent on the rising satellite forward channel). The same or different trajectory tables may be used for the setting satellite versus the rising satellite, depending on whether there are enough differences between the satellites, Gateways, or channels employed to merit different trajectory tables.

Upon receiving the VSAT request to hand over its forward traffic path to the rising satellite, the NAP changes its traffic forwarding such that traffic to the VSAT is sent through the rising gateway and satellite path. The NAP may provide the target rising satellite MODCOD to the rising gateway for encoding any traffic sent through this path. This might be provided as part of a path initialization or might be sent with traffic packets. The NAP may send some control signaling packet to confirm the forward path establishment through the rising satellite, in event there is no traffic available to be sent to the VSAT.

At operation 6, the VSAT reaches the ending condition for the forward MODCOD control process used during the hitless satellite handover transition. The hitless handover process may continue with actions beyond forward MOD-COD control, for example, completing a handover of the return path. At this point, the VSAT is still receiving any pre-handover in-transit traffic from the NAP via the setting satellite forward channel and may be receiving any post-handover new traffic from the NAP via the rising satellite forward channel.

Location of forward ACM MODCOD determination: In some embodiments, the VSAT determines the desired forward MODCOD based on the measured signal quality metric and trajectory table. In other embodiments, the VSAT may forward its measured metric value to the NAP, and the NAP or some other system may determine the appropriate MODCOD. The NAP may forward a metric value to the Gateway, and the Gateway (either setting gateway or rising gateway as appropriate in this example) might determine the appropriate MODCOD. In other embodiments, there might be some centralized or regionalized service beyond the NAP and Gateway, for example, an Internet cloud-hosted service, which receives the signal quality metric and determines the appropriate MODCOD.

Location of forward ACM MODCOD application: In some embodiments, the Gateway may perform both the FEC encoding and modulation as indicated by the signaled MODCOD. In other embodiments, NAP may perform both the FEC encoding and modulation, and the Gateway may perform the RF uplink functions. In other embodiments, the NAP may perform the FEC encoding, and the Gateway may perform the modulation and RF uplink functions. Such alternatives and others are independent of and compatible with the disclosed hitless handover process.

Forward Channel Allocation and Adaptation for Dedicated Channels

Systems that employ dedicated forward channels to deliver traffic to VSATs might benefit from the hitless handover process. The VSAT may simultaneously receive a dedicated forward channel via each satellite during the handover transition, and the switching of the forwarding path from a dedicated channel of one satellite to a dedicated channel of the other satellite is decoupled from switching of the return path from one satellite to the other.

Forward Channel Bandwidth Allocation for Dedicated Channels:

A VSAT receiving traffic through a dedicated forward channel of a setting satellite may be switched to a dedicated forward channel of a rising satellite. When the handover time is predictable and bandwidth allocation is prearranged (for example, such prediction might be implemented in a LEO or MEO system with a fixed site VSAT), a network bandwidth management function (in the Gateway, NAP or elsewhere) might proactively send or configure the terminal with its forward channel assignment for the rising satellite, ahead of the forward traffic path handover to that satellite. This pre-allocation would overlap for some period with a forward channel allocation for the setting satellite, enabling new traffic to be switched to the rising satellite channel while in-transit traffic delivery is completed through the setting satellite channel, with no pause needed to coordinate or redirect traffic delivery. A return channel bandwidth for the rising satellite may also be pre-allocated, and return bandwidth may be simultaneously available for both the rising and setting satellites.

In a system in which dedicated bandwidth allocation is used and is not prearranged, i.e., is dynamically requested by the VSAT and allocated by the Gateway, NAP or other control system, the VSAT may request and be allocated forward channel bandwidth for the rising satellite as part of the process to handover its forward traffic path to the rising satellite. This request may be implied within a handover request sent to the NAP or might be separate from and precede sending the handover request to the NAP. In either case, the implied or explicit bandwidth request for the rising satellite might be sent over the return channel of the setting satellite, and the forward bandwidth allocation for the rising satellite might be sent over either the dedicated forward channel of the setting satellite or over some shared control channel of the rising satellite which is received by the VSAT concurrently with the setting satellite dedicated channel. The VSAT may have dedicated forward bandwidth allocations for both the setting and rising satellites for some period, for example, until traffic in transit through the setting satellite path has been delivered, after which the setting satellite forward channel can be released.

Forward Channel Closed Loop Channel Power Control for Dedicated Channels:

Systems employing a dedicated forward channel for traffic might implement a closed loop power control scheme to optimize link performance. The VSAT measures a receive signal quality metric or metrics and provides feedback as appropriate to the Gateway to increase or decrease transmit power to achieve a target receive quality level. The VSAT or gateway may start a link at a high-power level and work down, or a low power level and work up, or at some other level (for example, based on an estimated path length for a LEO or MEO satellite). Determining an optimal starting transmit power level might be difficult. A high starting power level might best operate through path degradation (for example, weather attenuation, other interference), but might introduce adjacent channel interference until the power control loop adjusts the level. A low starting power level might give minimal interference but lead to poor initial link performance for a path degradation. A starting power level in some mid-range might be suboptimal in presence of weather attenuation at either extreme. In some embodiments, a starting power level may be chosen based on some shared common control channel received from the rising satellite, which channel would have propagated through the same atmospheric conditions and projecting an initial power level to indicate the forward channel bandwidth request for the rising satellite. This method may be vulnerable to presence of any channel-specific degradations, for example interference. Consequently, an alternative optimized and hitless method is described here.

The simultaneous reception of dedicated forward channels from a setting satellite and rising satellite may provide closed loop power control to adjust the power level of the rising satellite channel before the forward traffic path is switched to that channel. The VSAT may measure and provide power control feedback for the rising satellite forward channel in signaling to the NAP (or some other link control entity) via the setting satellite return channel. The feedback might be forwarded for use by the Gateway of the rising satellite, and used to adjust the forward channel transmit power level from the Gateway of the rising satellite, and the forward traffic path might be handed over to the rising satellite channel path once that link is being received by the VSAT at a target performance level. With this information, the transmit power level may initially be set to a lower value, minimizing interference into adjacent channels in case of clear sky condition, and be raised in case there is weather attenuation, without impact to ongoing traffic which is proceeding via the setting satellite forward channel. In this case, the handover start time might be advanced by an amount of time that is sufficient for power control convergence in presence of weather attenuation, irrespective of whether there is such weather attenuation for a given handover sequence.

Forward Channel ACM for Dedicated Channels:

Systems employing a dedicated forward channel might implement an adaptive coding/modulation scheme for that channel, for example DVB-S2 or DVB-S2X, to automatically and simultaneously optimize the link throughput and availability. In such systems, a decision must be made at which MODCOD to start, with choices analogous to those described above for closed loop power control. The system might start at a very robust MODCOD providing maximal protection to ensure traffic delivery in case of weather attenuation (or another path degradation) that cannot be known a priori, and automatically work up to an optimal operating MODCOD based on measured VSAT receive link quality and a trajectory table. This has the potential disadvantage that effective traffic throughput might initially be noticeably and unnecessarily reduced until the right operating point is reached. Alternatively, the system might start at a high MODCOD providing minimal protection, assuming clear sky link conditions, and automatically work down to an appropriate MODCOD in case of weather attenuation. This has the potential of noticeable initial packet loss and/or retransmission delay for the end-to-end traffic flow. As with power control, a mid-point starting MODCOD might be chosen, with some probability of either problem to some degree. A starting MODCOD might instead be chosen based on measurement of some shared common control channel from the rising satellite, and as with power control, be vulnerable to channel-specific degradation such as interference.

As with the closed loop power control, advantage can be taken from the simultaneous reception of dedicated forward channels from a setting satellite and rising satellite to use ACM to adjust the MODCOD of the rising satellite channel before the forward traffic path is switched to that channel. The VSAT might measure and provide ACM feedback for the rising satellite forward channel in signaling to the NAP (or some other link control entity) via the setting satellite return channel. The ACM feedback might be used to adjust the forward channel MODCOD for the rising satellite, and the forward traffic path might be handed over to the rising satellite channel path once the link is being received by the VSAT at a target performance level.

Optimizing Return Link Operation During the Hitless Handover Transition

Handover of the return communication path from one satellite to another satellite might require the terminal to perform various operations, depending on the satellite waveforms and access methods employed, such as:

Learn parameter values needed to initiate link control operations or request return path bandwidth;
Synchronize return path transmissions to shared channel timing for the new satellite path;
Converge to the proper return transmit power level for the new satellite path;
Implement link adaptation to optimize return traffic performance for the new satellite path; and
Obtain bandwidth for return path traffic.

Return Channel Parameter Learning

Many satellite systems employ protocols whereby Gateways advertise certain common access parameter values in forward channel broadcasts. The terminals learn and subsequently use the parameters for return channel access and other higher layer link control and protocol operations. In case of parameters that do not change from beam to beam and satellite to satellite, a terminal performing a handover might use values learned from its current satellite forward channel in establishing access via the new satellite to which it is transitioning. This is also the case in event the system advertises adjacent satellite parameter values on the forward channel, for example, ephemeris parameters for the respective adjacent LEO satellites being distributed via each LEO satellite forward channel. However, there might also be a class of satellite and beam-specific access and control parameter values that a terminal must learn upon handover to a given satellite. System information parameter values for the new satellite or beam might be broadcast from the Gateway via the forward channel of that satellite or beam, such that a terminal performing a handover must switch to and synchronize with the new satellite forward channel, and then await receipt of the necessary system information broadcast messages, before accessing the return channel. The wait time might be negligible for system information that is broadcast very frequently, for example, every second or more often, but might have a noticeable traffic delay impact for system information messages that are sent less frequently, for example every 5 to 30 seconds.

This information may be obtained ahead of when it is needed by using the phased array antenna, and be immediately available for the terminal when it is ready to transmit in the return path of the new satellite. The terminal can learn all necessary rising satellite system information parameters while operating over the setting satellite, to have this information in place for operation over the rising satellite. This learning can be performed before or after the terminal has requested the forward path to be switched from the setting to the rising satellite, depending on the types of parameter values required, but before the terminal switches its return path to the rising satellite.

Return Channel Synchronization for Shared Return Channels

Some satellite systems use return channels shared between terminals on a time division multiple access (TDMA) basis using a frame structure with time slots. Terminals might be allocated dedicated transmit access by some entity, such as a bandwidth allocation function in the Gateway, with such dedicated assignment being for transmission in specific time slots of specific frames, allocated such that multiple terminals are not assigned to transmit at the same time on the same return channel. In some embodiments, a terminal might transmit in slots designated for contention access, sometimes called Aloha or slotted Aloha access. Aloha channels are generally advertised via forward channel system information. In some systems, the terminal might use an Aloha channel to request assignment of dedicated TDMA return slots that it can use for traffic or management or control signaling.

TDMA systems depend on timing synchronization between terminals that share return channels, thereby avoiding traffic loss due to interference caused when terminal transmissions overlap for a given channel. Terminals might synchronize return channel timing by deriving that timing from the forward channel. In some systems, the Gateway might respond to an initial terminal return transmission with a fine timing correction, to precisely compensate for terminal or satellite position—this timing feedback might be sent in response to a return traffic or bandwidth request message, or might be part of a dedicated timing and transmit power ranging process. Whether or not such closed loop timing correction is employed, it is necessary for the terminal upon first accessing a satellite or beam to receive the forward channel, synchronize itself to the forward timing base, and derive the return timing relationship, before transmitting on a return channel. This might introduce or extend the duration of return path traffic transmission interruption in case of a terminal handover from one satellite to another.

In some embodiments, the terminal can use the phased array antenna and associated processing to receive and extract timing from the new satellite forward channel, and use that forward timing reference to derive return timing information for the new satellite, while continuing to operate its return traffic path through the setting satellite using the return timing that is appropriate for that setting satellite. This overlap enables the terminal to transmit on the new satellite return channel without additional return synchronization delay.

When a dedicated ranging process is required on satellite transition to precisely synchronize terminal return transmit timing prior to that terminal sending return path traffic, time gaps in the shared return channel transmission schedule allocated to the terminal to send traffic on its current satellite can be used to perform the ranging process on the new satellite. This allows the terminal to hop transmissions between the old and new satellites using its phased array antenna. As such the return traffic transmission via the new satellite is not noticeably delayed for ranging, as it otherwise might be. The hopping transmissions do not call for concurrent transmission of multiple signals by the terminal, but rather, a programmable switching of an antenna pointing path for each given transmission. The terminal may simultaneously maintain and select from the two independent return timing bases, as derived from the old and new forward channels. The terminal may stretch out execution of the return path satellite handover as necessary based on its traffic transmission schedule on the current satellite, so that it might complete ranging on the new satellite without disrupting traffic being sent via the old satellite. The terminal may start the hitless handover process early enough during its own coverage overlap from the two satellites so that the ranging is completed on the new satellite prior to losing coverage of the old satellite, but may perform the transition prior to losing coverage of the old satellite with traffic disruption, if necessary.

When return channel time slots are allocated specifically for ranging by the Gateway (or other allocation entity) of the new satellite, then either this allocation must be coordinated with the return channel time slots allocated for traffic by the Gateway of the old satellite, or else the ranging slots may be overallocated and understood to be opportunistic in that the terminal will use them only if they do not overlap with its ongoing traffic transmission. By the terminal switching its return transmission path between the old and new satellite on a per-transmission basis, the terminal may request allocated ranging bandwidth by transmitting a request to the Gateway of the new satellite via the return path of the new satellite. The dedicated return channels may be continuous and consequently lack time gaps that can be used to send ranging bursts on the new satellite, as opposed to shared return channels for which the terminal is allocated a dedicated set of time slots for transmission; however, in case there exist other types of discontinuous dedicated return channel, this method is also applicable.

FIG. 7 illustrates ranging transmissions interspersed with traffic transmissions according to various embodiments.

FIG. 7 illustrates a transmit timing relationship on a timeline 700 for a setting satellite, and transmit timing relationship on a timeline 750 for a rising satellite. In FIG. 7, the return channels of the old and new satellites are assumed to be shared channels, with timing divided into exemplary frames and time slots. The old and new satellite paths may not be precisely synchronized, and a terminal must derive and use different transmit timing for the different satellites. Timeline 700 shows example traffic transmission via the setting satellite including old satellite frame start timing 702, slot start timing 704 and traffic return transmission allocation timing 706. The timeline 750 shows interspersed ranging transmission via the rising satellite including new satellite frame start timing 752, slot return timing 754 and ranging return transmissions timing 756. The transmissions to the setting and rising satellite necessarily do not overlap in time, or in violation of whatever guard time is necessary to switch transmission between channels.

Return Channel Closed Loop Channel Power Control

After establishing a starting power level for return path transmission over the new satellite, a terminal may use standard power control processes to adjust. If the terminal starts at too high a power level, it might interfere with signals of other terminals on adjacent frequencies. If the terminal starts at too low a power level, transmitted packets might not be successfully received at the Gateway until a power control loop corrects the transmit power level. In an example closed loop power control loop, the Gateway measures the power level at which a terminal transmission is received and provides feedback to the terminal via the forward channel when appropriate for the terminal to raise or lower the transmit power level. Alternatively, the Gateway might send a receive power metric to the terminal, and the terminal might use that value to make power control adjustment decisions. The terminal cannot simply transmit over the new satellite using the same power level it has used for the old satellite, as those satellites might have sufficiently different propagation paths (due to weather, distance, interference, or other factors) such that using the same transmit power level might not be appropriate. A typical solution for this problem is to derive the starting transmit power level for the new satellite using a received forward carrier signal quality metric of the new satellite, recognizing that the forward channel will transmit the same atmospheric path as a return channel. This might not result in ideal initial performance, as the forward and return channels might use sufficiently different frequency bands as to be subject to different degradations, and might have differing levels of co-frequency and adjacent channel interference. These effects might lead to initial performance degradation at the time of handover of the return path from the old satellite to the new satellite, until a power control loop optimizes the return path transmit power level.

A terminal might use gaps in its traffic transmission schedule for the old satellite, shown in the FIG. 7 example, to transmit power ranging bursts over the new satellite, and use closed loop power control feedback to optimize new satellite transmit power prior to switching its return traffic path to the new satellite. (Dedicated return channels are assumed here to be continuous and consequently to lack time gaps that can be used to send test bursts on the new satellite, but in case of discontinuous dedicated return channels, this method is also applicable.) Timing and power ranging might be implemented using the same ranging transmissions.

Return Channel Link Adaptation

A satellite system might employ various techniques for return link adaptation, including one or more of dynamic adaptation of forward error correction (FEC) coding, dynamic adaptation of modulation method, and dynamic adaptation (or selection) of the return channel symbol rate. Return channel link adaptation enables the system to simultaneously optimize throughput, capacity, and error rates independently for each terminal, and might be applicable whether the return channel is shared between terminals or is dedicated to a single terminal. This is achieved by the Gateway measuring some receive signal quality metric, and either conveying that metric to the terminal in order that the terminal can make link adaptation decisions, or else by the Gateway (or other entity) making link adaptation decisions and conveying those decisions to terminals for implementation.

As described for return power control above, a terminal executing a return path satellite handover must establish a starting link adaptation setting for transmission over the new satellite, after which the standard link adaptation feedback and processes might be employed to make appropriate adjustments. If the terminal starts with an overly optimistic link adaptation setting, the terminal transmission might not successfully be received by the Gateway. If the terminal starts with an overly conservative link adaptation setting, the terminal might achieve unnecessarily low throughput until link adaptation feedback optimizes the setting. As with power control above, an initial setting might be chosen based on a forward channel signal quality metric for the new satellite, subject to some of the same sources of error as is the initial transmit power setting.

The terminal might use gaps in its traffic transmission schedule for the old satellite, shown in the FIG. 7 example, to transmit bursts over the new satellite, and use link adaptation feedback to optimize new satellite link adaptation prior to switching its return traffic path to the new satellite. (Dedicated return channels are assumed here to be continuous and consequently to lack time gaps that can be used to send test bursts on the new satellite, but in case of discontinuous dedicated return channels, this method is also applicable.) These test bursts might be the same bursts as are used for return timing synchronization fine tuning and for return power control convergence.

Return Channel Bandwidth Allocation

A terminal switching its return path from an old satellite to a new satellite might require a return channel allocation to maintain return traffic flow. For those applications in which return traffic is intermittent and is queued for transmission, it might be sufficient for the terminal to switch its return path to the new satellite and make a return bandwidth request when needed—the impact of this on return traffic throughput will be no more disruptive or perceptible than will happen as a matter of course as traffic arrives once the terminal communication is in operation over the new satellite. However, there might be some applications for which traffic is nearly continuous, and for which a bandwidth request delay after switching the return path to the new satellite will be perceptible and disruptive. Real-time streaming video transmission or video conferencing might be possible examples. Another case might be voice or some other application requiring a low jitter grade of service. Two methods are described here to optimize for this case: the relay of bandwidth request from the old to new gateway, and the opportunistic use of return transmission gaps of the old satellite to transmit a bandwidth request for the new satellite.

A VSAT may use the return path of the old satellite to request the return bandwidth allocation for the new satellite, and switch the return transmit path to the new satellite when that return bandwidth allocation is provided. A Gateway of the old satellite (or some intermediary such as the NAP) may relay the return bandwidth request to the Gateway (or bandwidth allocation function) of the new satellite. The allocation response message might be sent on the old or the new satellite forward channel, as the terminal is at this point receiving both. This method might be applied whether the current and/or the requested return channel is dedicated or shared. In some embodiments, a bandwidth request is relayed from the setting gateway to the rising gateway, for example, from gateway 502 to gateway 520 of FIG. 5. In other embodiments, the bandwidth request is relayed from gateway 502 to gateway 520 via the NAP 510 of FIG. 5.

Alternatively, a VSAT may transmit the bandwidth request on a return channel of the new satellite during a time gap between bandwidth allocations of the old satellite. The principles are analogous to those previously described for return channel synchronization, power control and link adaptation. This method is suitable for shared return channels which have allocation time gaps. In some embodiments, this method may be used for a dedicated channel allocation that is discontinuous. In some embodiments, the terminal might have bandwidth requests and/or allocations active for both satellites at the same time, and hand over its return traffic path when the new satellite bandwidth allocation is received.

Handling of Signaling Packet Loss During the Hitless Handover Transition

Satellite systems are subject to packet loss due to signal degradation that might occur during uplink and downlink transit, and waveforms and link budgets are designed to limit such loss to a targeted low probability. Systems might use Forward Error Correction (FEC) to avoid packet loss due to a low level of bit errors, and might use higher level protocols including timeouts, positive/negative acknowledgement messages and retransmissions to recover lost traffic or signaling packets when appropriate. Protocols might be designed to recover from loss of signaling packets that would otherwise disrupt or delay critical operations.

By simultaneously receiving and processing the forward channel path from the old and new satellite, the terminal can continue forward traffic operation on the old satellite, when signaling to hand over the traffic path to the new satellite is lost and must be regenerated. The terminal can set a timer to confirm that the transition to the new satellite occurs when expected, retransmit the request in case of timeout, and continue to receive forward traffic via the old satellite all the while. In some embodiments, the terminal may obtain a dedicated forward channel for the new satellite, for which either the request or assignment message might be lost; in this case, the terminal may retain and continue to receive traffic via its dedicated forward channel of the old satellite, while repeating its request for the new satellite.

By separating the handover to the new satellite of the return path from handover of the forward path, the terminal may continue return path traffic operation via the old satellite until timing synchronization, power control fine tuning, link adaptation and return path bandwidth allocation are sufficiently in place for the new satellite. When terminal link optimization messages or associated Gateway feedback messages are lost, the terminal may employ timers and retransmissions to recover from such losses, while in operational coverage of the old satellite and can continue to use the old satellite return path for traffic, i.e., the terminal can delay the return path handover until a successful handover or a loss of the old path. Similarly, the terminal can use timers and retransmit requests to recover from lost request or assignment messages for return path bandwidth allocation.

Establishing Gateway Communication Path Context for the New Path

Some satellite system designs might require that a terminal establish a communication context with a new Gateway and/or NAP construct, when a satellite handover involves transition to a new Gateway or NAP. For example, in the embodiments of FIG. 4c or FIG. 4d separate NAPs are associated with the separate Gateways, and in the embodiment of FIG. 4e a common NAP is associated with the separate Gateways. A communication context might include, for example, a routing path (e.g., which forward channel can be used to reach the terminal in case there are multiple forward channels in a beam), a security context including authentication and encryption, a service plan subscription or other configuration parameters, a service association to a specific NAP entity which will provide or relay terminal service, or other contextual relationships. Establishing such a context might involve the terminal receiving information broadcasts from the Gateway or NAP, and exchanging signaling messages with the Gateway and/or NAP. Context signaling may be completed, prior to switching traffic to the new satellite, to achieve the hitless handover objective.

The terminal may employ the phased array antenna to receive the new satellite forward channel simultaneously with the old satellite forward channel to receive all necessary information broadcasts via the new satellite, while maintaining traffic flow through the old satellite.

Similarly, the terminal can receive all forward signaling from the new Gateway or new NAP via the new satellite forward channel, while maintaining traffic flow through the old satellite. In case of separate satellite-specific, Gateway-specific or NAP-specific security context or other parameters, the terminal can retain and use parameters for the old satellite path for communication over the old satellite, and can retain and use parameters for the new satellite path for communication over the new satellite. As one example, the terminal might be provided with and use different decryption keys to decrypt packets received via the respective satellite forward channels.

Context establishment signaling with a new Gateway or NAP in the return direction might be performed, while traffic flow is maintained through the old satellite return path. For example, signaling messages might be sent via the old satellite return path to the old satellite Gateway or NAP, and relayed to the new satellite Gateway or NAP. In this case, the associated forward context signaling might be sent via the new satellite, and the return signaling might be sent via the old satellite. Alternatively, when the terminal uses shared return channels with time gaps in its return bandwidth allocation for the old satellite, the terminal might transmit context establishment signaling on a new satellite return channel during such gaps. This method has been described above in the context of return path timing synchronization, power control ranging and link adaptation, with a timing example illustrated in FIG. 7. In this method, return traffic flows through the old satellite while at least some return signaling is sent via the new satellite.

Application of Methods to Achieve Hitless Beam-to-Beam Handover Under a Given Satellite In some embodiments, the present teachings provide a hitless handover from one spot beam to another spot beam under a given satellite, while the terminal is in the overlap area of two beams. This scenario is applicable to moving satellite constellations, for example to LEO or MEO constellations in which beam coverage moves across the Earth and the terminal must periodically be handed over to a new beam of the same satellite, or for GEO constellations in which a mobile terminal moves from one beam to another beam of the same satellite.

The antenna and the dual demodulators and decoders of the terminal may be used to receive forward channels of both beams simultaneously, including simultaneous dual pole reception if that is applicable for the two beams, along with associated polarization control.

The terminal and Gateway operate like the dual satellite embodiments to prepare for forward link operation of the new beam, while maintaining forward traffic flow through the old beam. In some embodiments, the two beams may be served by different Gateways, and forward channel synchronization, ACM link adaptation and power control processes may be analogously performed.

Once the forward channel path has been established and sufficiently optimized, the terminal may signal to switch its forward traffic flow to the new spot beam, while maintaining the return traffic flow through the old spot beam.

The terminal and Gateway then use the teachings for the dual satellite case to prepare for return link operation of the new beam, while maintaining return traffic flow through the old beam. The teachings for return channel parameter learning, synchronization, power control and link adaptation optimization, and bandwidth allocation may be also used.

Once the return path for the new beam has been appropriately established and optimized, the terminal may transition its return traffic flow to the new beam return path.

The terminal, Gateway and NAP may use the present teachings to establish the communication context for the new beam, during forward and return path handover.

Application of Hitless Handover Principles for Satellites with Different Waveforms The present teachings are applicable even if different waveforms or frequency bands are employed for satellite systems between which hitless handover is provided. The terminal apparatus is assumed capable to receive and transmit the applicable waveforms and frequency bands, and in that context the described processes and signaling flows are applicable.

Application of Hitless Handover Principles for Satellites with Inter-Satellite Links Satellite constellations might employ inter-satellite links (ISLs) to selectively relay control signaling and end user traffic across the constellation, to maintain continuity of communication between a given terminal and Gateway. For example, in a LEO system it might be that a terminal remains under coverage of a given satellite as the satellite moves some distance in its orbital arc, but the Gateway with which that terminal is communicating might no longer be in coverage of that same satellite. An ISL might be used in this case to relay traffic between the satellite the terminal is using and a second satellite that covers the Gateway, to maintain terminal-Gateway communication flow. In another example, Gateways may be sparsely placed geographically as compared to the constellation terminal coverage, and the ISLs are used to backhaul traffic to one or more of the Gateway locations. Various other ISL applications can be envisioned, even for GEO systems or for hybrid systems with links between LEO, MEO or GEO satellites.

For satellite constellations employing ISLs, some system functions may be placed in the satellite rather than in the Gateway or NAP, for example, terminal end-to-end link adaptation signaling, or system information broadcast might be between the terminal and satellite, rather than between the terminal and Gateway and using the satellite as a relay. Even bandwidth allocation might be performed by the satellite, or else bandwidth allocation might be retained as a function of a Gateway or some common ground control system. Despite these possible differences from the previously described use cases, the general hitless handover principles described can be applied to constellations with ISLs. For this application, the downlink from the satellite to the terminal takes the place of the forward channel from the Gateway to terminal for certain operations, and the uplink from the terminal to the satellite takes the place of the return channel from the terminal to the Gateway for other operations, depending on what functions have been placed in the satellite rather than in the Gateway or NAP.

The terminal may use its phased array antenna to simultaneously receive a downlink channel from both satellites, while transmitting an uplink channel to one satellite, or one at a time. The terminal may maintain its uplink and downlink traffic path via the old satellite, while simultaneously performing downlink and forward path setup and adaptation operations with the new satellite that might otherwise disrupt forward traffic flow. In some embodiments, the terminal signals to switch its downlink and forward traffic path to the new satellite once those setup activities have been performed, maintaining its return traffic path via the old satellite, and continuing to receive the downlink from the old satellite as necessary to maintain uplink return synchronization with the old satellite.

The terminal may perform uplink and return path setup and adaptation operations with the new satellite that might otherwise disrupt return traffic flow, while continuing return traffic flow through the old satellite and uplink. The terminal may switch its uplink and return traffic path to the new satellite once those setup activities have been performed. The terminal may handle out of order traffic packets, lost control packets and signaling packets.

Application of Hitless Handover Principles for Mesh Communication Satellite Systems The preceding paragraphs describe the hitless handover apparatus and processes in the context of a system in which a terminal communicates with a Gateway, but there are some systems in which small (or large) terminals communicate directly without transit through a concentrating Gateway. This type of system is sometimes referred to as a mesh system, and might use a constellation with or without ISLs, depending on the system objectives and technology. The principles, apparatus and methods described in this invention can be applied to mesh communication satellite systems, including systems with a combination of mesh and hub-spoke connectivity. In mesh systems, a terminal will have one or several peer terminals with which it communicates, and each peer terminal acts in place of the Gateway and NAP with respect to the above hitless handover description, so for example, a terminal might signal handover of its forward path independently to each peer terminal, and might setup for handover of its return path independently for each peer terminal. The terminal might also communicate with one or more control terminals that provide access to certain centralized functions, such as commissioning, authentication or bandwidth allocation—for simplification of this description, control terminals may be considered mesh peer terminals. Furthermore, peer terminals might also execute the same hitless handover processes as they need to move from satellite to satellite, for example in a LEO or MEO constellation. The application of hitless handover principles for mesh communication satellite systems is summarized in the following points:

A given mesh terminal may use its phased array antenna to simultaneously receive communication from peer terminals from both satellites, while sending communication to all such peer terminals via only one satellite, or one satellite at a time.

Independently for each peer terminal, the terminal may require that the handover maintains the receive and transmit traffic paths via the old satellite, while simultaneously performing a receive path setup and adaptation operations via the new satellite that might otherwise disrupt receive traffic flow.

Independently for each peer terminal, the terminal may require the handover signals to switch the receive traffic path to the new satellite once those setup activities have been performed, maintaining its transmit traffic path via the old satellite. Switches might not be synchronized, and the terminal might be receiving traffic from one mesh peer terminal via the new satellite, while still receiving traffic from another mesh peer terminal via the old satellite.

Independently for each peer terminal, the terminal may perform transmit path setup and adaptation operations with the new satellite that might otherwise disrupt transmit traffic flow, while continuing transmit traffic flow through the old satellite. During this period, a given peer terminal might be receiving traffic or signaling via one satellite from the terminal being handed over, while sending traffic to that same terminal via another satellite. This can be done if the peer terminal is in coverage of both satellites, otherwise, ISLs may be used as a relay.

Once the terminal being handed over has completed transmit path setup for all peer terminals, it switches its transmit traffic path to the new satellite.

Generalized Hitless Handover Sequence

The present teachings may be applied for a variety of VSAT transition scenarios, for example, from satellite to satellite, from beam coverage to beam coverage under a satellite, from gateway coverage to gateway coverage under a beam or between beams, or combinations thereof. Note that two gateways might provide service coverage via different outroutes and inroutes for the same terminal service beam of the same satellite, for different beams, or for different satellites. The generalized application of these disclosed techniques entails simultaneous reception of two outroutes, transmission of one inroute associated with one of the two outroutes, and decoupling of switching of the VSAT outroute and inroute traffic paths, applied such that the VSAT and its traffic paths can be transitioned from one communication path to another without traffic interruption, loss, replication or repetition. Use of a phased array antenna and multiple demodulators within the VSAT enables these techniques to be applied for certain transition scenarios. Certain additional disclosed techniques may apply depending on the type of transition, for example, the optimization of timing synchronization in case of a satellite transition might or might not be required for a beam transition under the same satellite. The following paragraphs disclose a generalized application of hitless handover.

FIG. 8 illustrates a process for a hitless handover of communications in a Radio Frequency (RF) according to various embodiments.

A process 800 may include an operation 802 to receive communications via a first outroute signal in a first coverage area with a phased array antenna over a first outroute and processed by the first demodulator. The process 800 may include an operation 804 to transmit a first inroute signal in the first coverage area with the phased array antenna over a first inroute. The process 800 may include an operation 806 to determine that the first outroute is setting when the terminal is imminently leaving the first coverage area and that a second outroute is rising for the second coverage area the terminal is imminently entering. This determination might be made by the terminal, or under direction of some central control authority. The process 800 may include an operation 808 to acquire a second outroute signal in a second coverage area with the phased array antenna over the second outroute and processed by the second demodulator. The process 800 may include an operation 810 to send a request to receive the communications over the second outroute, while the terminal is disposed in an overlap of the first coverage area and the second coverage area. The process 800 may include an operation 812 to establish communications via the second outroute. The process 800 may include an operation 814 to hand over communications from the first outroute to the second outroute while the terminal is disposed in the overlap. The process 800 may include an operation 816 to establish a second inroute via the second coverage area after the establishing of the second outroute.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

I claim:

1. A method for a hitless handover of communications in a Radio Frequency (RF) network, the method comprising:
    providing a terminal comprising a first demodulator, a second demodulator and a phased array antenna;
    receiving communications via a first outroute signal in a first coverage area with the phased array antenna over a first outroute and processed by the first demodulator;
    transmitting a first inroute signal in the first coverage area with the phased array antenna over a first inroute;
    determining that the first outroute is setting when the terminal is imminently leaving the first coverage area and that a second outroute is rising when the terminal is entering a second coverage area;
    acquiring a second outroute signal in a second coverage area with the phased array antenna over the second outroute and processed by the second demodulator;
    sending a request, over the first inroute, to receive the communications over the second outroute, while the terminal is disposed in an overlap of the first coverage area and the second coverage area;
    establishing communications via the second outroute; and
    handing over communications from the first outroute to the second outroute while the terminal is disposed in the overlap,
    wherein the communications are received by the terminal without interruption, without a pause and without replication over the first outroute and the second outroute.

2. The method of claim 1, wherein the communications are received simultaneously by the terminal over the first outroute and the second outroute.

3. The method of claim 1, wherein the communications are received over the first outroute without interruption while establishing the second outroute.

4. The method of claim 1, wherein
    the network comprises a first beam comprising the first outroute, a first gateway servicing the first outroute, a first satellite generating the first beam, a second beam comprising the second outroute, a second gateway servicing the second outroute, a second satellite generating the second beam, and a Network Access Point (NAP),
    the first outroute differs from the second outroute in one or more of the first outroute, the first gateway, the second gateway, the first beam, the second beam, the first satellite and the second satellite, and
    the handing over identifies the second outroute, the second gateway and the second satellite to the NAP.

5. The method of claim 4, wherein the first satellite differs from the second satellite, and the NAP redirects traffic flows for the terminal via the first gateway to the second gateway and facilitates the establishing of the second outroute.

6. The method of claim 1, wherein the establishing comprises orienting the phased array antenna via the second outroute while concurrently communicating over the first outroute.

7. The method of claim 1, wherein the establishing comprises determining a signal quality metric for the second outroute while concurrently communicating over the first outroute.

8. The method of claim 1, wherein the establishing comprises transmitting via the first inroute until a determining of timing synchronization, power control fine tuning, link adaptation and an outroute bandwidth allocation as applicable for the second outroute is complete.

9. The method of claim 1, wherein the handing over comprises maintaining addressing and a protocol acceleration context after handing over is complete.

10. The method of claim 1, wherein
    the handing over comprises transitioning from the first outroute to the second outroute when the establishing is successful, and
    the receiving comprises receiving communications over the first outroute and the second outroute and maintaining an outroute packet order.

11. The method of claim 1, wherein
    the handing over comprises transitioning from the first outroute to the second outroute when the establishing is successful, and
    the receiving comprises receiving communications only over the second outroute after the transitioning is complete.

12. The method of claim 1, further comprising establishing a second inroute via the second coverage area after the establishing of the second outroute.

13. The method of claim 12, wherein the communications are transmitted simultaneously by the terminal over the first inroute while the terminal is receiving communications over the second outroute.

14. The method of claim 12, wherein the communications are transmitted over the first inroute without interruption while establishing the second inroute.

15. The method of claim 12, wherein the establishing comprises determining a signal quality metric for the second inroute.

16. The method of claim 12, wherein the establishing comprises transmitting via the first inroute until a determining of timing synchronization, power control fine tuning, link adaptation and an inroute bandwidth allocation as applicable for the second inroute is complete.

17. The method of claim 12, wherein the establishing comprises transmitting via the first inroute an inroute bandwidth allocation request for the second inroute.

18. The method of claim 12, wherein the handing over comprises maintaining addressing and a protocol acceleration context after handing over is complete.

19. The method of claim 12, wherein
    the handing over comprises transitioning from the first inroute to the second inroute when the establishing of the second inroute is successful, and
    the transmitting comprises transmitting communications over the first inroute and the second inroute and maintaining an inroute packet order.

20. The method of claim 12, wherein
    the handing over comprises transitioning from the first inroute to the second inroute when the establishing of the second inroute is successful, and
    the transmitting comprises transmitting communications only over the second inroute after the transitioning is complete.

21. The method of claim 12, wherein the establishing of the second inroute comprises transmitting during time gaps in a first inroute transmission schedule of the first inroute to perform, for the second inroute, one or more of a timing ranging, power control fine tuning, and link adaptation.

\* \* \* \* \*